United States Patent
Yoneyama

(10) Patent No.: US 7,749,122 B2
(45) Date of Patent: *Jul. 6, 2010

(54) AUTOMATIC TRANSMISSION

(75) Inventor: Nobuyuki Yoneyama, Shizuoka (JP)

(73) Assignee: JATCO Ltd, Fuji-shi (JP)

( * ) Notice: Subject to any disclaimer, the term of this patent is extended or adjusted under 35 U.S.C. 154(b) by 543 days.

This patent is subject to a terminal disclaimer.

(21) Appl. No.: 11/715,881

(22) Filed: Mar. 9, 2007

(65) Prior Publication Data

US 2007/0232432 A1 Oct. 4, 2007

(30) Foreign Application Priority Data

Mar. 30, 2006 (JP) .............................. 2006-092802

(51) Int. Cl.
*F16H 31/00* (2006.01)

(52) U.S. Cl. ...................... 475/116; 475/119; 475/121; 477/906

(58) Field of Classification Search .................. 475/116, 475/119, 121; 477/125, 906, 907
See application file for complete search history.

(56) References Cited

U.S. PATENT DOCUMENTS 7,513,850 B2 * 4/2009 Yoneyama .................... 477/80

7,517,302 B2 * 4/2009 Kobayashi et al. .......... 477/125

FOREIGN PATENT DOCUMENTS

| JP | 2000-240785 A | 9/2000 |
| JP | 2003-049937 A | 2/2003 |

OTHER PUBLICATIONS

Translation of Information disclosure statement reference JP2000240785.*
U.S. Appl. No. 11/525,220, filed Sep. 22, 2006, Yoneyama.

* cited by examiner

Primary Examiner—Tisha D Lewis
(74) Attorney, Agent, or Firm—Foley & Lardner LLP

(57) ABSTRACT

An automatic transmission includes a planetary gear arrangement, and a plurality of engaging elements each arranged to vary an engagement state among the rotating elements of the planetary gear arrangement in such a manner to establish a normal gear ratio set and an emergency gear ratio set excluded from the normal gear ratio set. A control section performs the following: selecting a gear from the normal gear ratio set in accordance with a running state of a vehicle under normal operating conditions; controlling the engagement state of each of the engaging elements in such a manner to shift into the selected gear; establishing, when an interlock state is detected, an escape gear by releasing one of the engaging elements needed to be applied to establish the selected gear; and identifying an incorrectly-applied engaging element in accordance with the running state of the vehicle resulting from establishing the escape gear.

4 Claims, 19 Drawing Sheets

|      | B1<br>Fr/B | C1<br>I/C | C2<br>D/C | C3<br>H&LR/C | B2<br>LOW/B | B3<br>2346/B | B4<br>R/B | F1 | F2 |
|------|------------|-----------|-----------|--------------|-------------|--------------|-----------|-----|-----|
| 1ST  | (○)        |           |           | (○)          | ○           |              |           | ○   | ○   |
| 2ND  |            |           |           | (○)          | ○           | ○            |           |     | ○   |
| 3RD  |            |           | ○         |              | ○           | ○            |           |     |     |
| 4TH  |            |           | ○         | ○            |             | ○            |           |     |     |
| 5TH  |            | ○         | ○         | ○            |             |              |           |     |     |
| 6TH  |            | ○         |           | ○            |             | ○            |           |     |     |
| 7TH  | ○          | ○         |           | ○            |             |              |           | ○   |     |
| REV. | ○          |           |           | ○            |             |              | ○         |     |     |

|      | 1ST     | 2ND     | 3RD     | 4TH     | 5TH     | 6TH     | 7TH     | REV     |
|------|---------|---------|---------|---------|---------|---------|---------|---------|
| SOL1 | ON(○)   | ON(○)   | ON(○)   | OFF(×)  | OFF(×)  | OFF(×)  | OFF(×)  | OFF(×)  |
| SOL2 | ON(×)   | ON(×)   | ON(×)   | ON(×)   | OFF(○)  | OFF(○)  | OFF(○)  | ON(×)   |
| SOL3 | ON(○)   | OFF(×)  | OFF(×)  | OFF(×)  | OFF(×)  | OFF(×)  | ON(○)   | ON(○)   |
| SOL4 | OFF(○)  | OFF(○)  | ON(×)   | OFF(○)  | OFF(○)  | OFF(○)  | OFF(○)  | OFF(○)  |
| SOL5 | OFF(×)  | ON(○)   | ON(○)   | ON(○)   | OFF(×)  | ON(○)   | OFF(×)  | OFF(×)  |
| SOL6 | ON(×)   | ON(×)   | OFF(○)  | OFF(○)  | OFF(○)  | ON(×)   | ON(×)   | ON(×)   |
| SOL7 | ON(○)   | ON(○)   | ON(○)   | OFF(×)  | OFF(×)  | OFF(×)  | OFF(×)  | ON→OFF  |

FIG.14

| | | | SELECTED GEAR | | | | | | |
|---|---|---|---|---|---|---|---|---|---|
| | | | 1ST, 2ND, 3RD | 4TH | 5TH | 6TH | 7TH | | |
| INCORRECTLY APPLIED ENGAGING ELEMENT | 2346/B | B3 | 2ND | --- | --- | --- | --- | | |
| | H&LR/C | C3 | 1ST | --- | 6TH | --- | 6TH | | |
| | I/C | C1 | --- | 5TH | --- | --- | --- | | |
| | D/C | C2 | 1.5TH | --- | --- | 5TH | 5TH | | |
| | Fr/B | B1 | 1ST | 2.5TH | 7TH | 7TH | --- | | |
| ENGAGING ELEMENT RELEASED AT INTERLOCK STATE FAILURE | | | ALL RELEASED (AND THEN LOW/B APPLIED UNDER CONDITION THAT VEHICLE SPEED IS BELOW SET VALUE) | 2346/B | D/C | 2346/B | Fr/B | | |

| | POSSIBLE GEAR RATIOS UNDER FAILURES ||||||||||
| | | >1ST | 1ST | 1.5TH | 2ND | 2.5TH | 3RD | 4TH | 5TH | 6TH | 7TH |
|---|---|---|---|---|---|---|---|---|---|---|---|
| SELECTED GEAR | 1ST | | O | ☆ | | | | | | | |
| | 2ND | | ☆ | | O | | ☆ | | | | |
| | 3RD | | | ☆ | ☆ | | O | | | | |
| | 4TH | | | | | ☆ | | O | | | |
| | 5TH | | | | | ☆ | | | O | | |
| | 6TH | | | | | | | | | O | |
| | 7TH | | | | | | | | | | O |

HIGH← ACTUAL GEAR RATIO →LOW

REGION OF NEUTRAL STATE FAILURE

REGION OF ABNORMAL GEAR RATIO FAILURE

AUTOMATIC TRANSMISSION

BACKGROUND OF THE INVENTION

The present invention relates generally to an automatic transmission, and more particularly to a process of escaping from an interlock state due to a failure in which an engaging element is incorrectly applied.

There is a vehicle-automatic transmission including a control system that detects electrical failures in solenoids and sensors provided in a hydraulic control circuit, and performs a shift control operation in accordance with the state of the failure.

In addition to such electrical failures, mechanical failures, such as valve stiction and entrance of foreign matter, are possible in each valve for regulating a hydraulic pressure supplied to a frictional engaging element.

It is possible that, due to such valve failures, an engaging element to be disengaged is incorrectly engaged to cause an interlock state of the automatic transmission.

Japanese Patent Application Publication No. 2003-49937, henceforth referred to as "JP2003-49937", shows a process of escaping from an undesired interlock state of an automatic transmission. In order to detect an abnormality due to stiction of a valve for regulating a hydraulic pressure supplied to each frictional engaging element, the automatic transmission includes a signal-pressure-operated valve which operates in response to occurrence of at least an abnormality in the hydraulic pressure supplied to one of the frictional engaging elements. The automatic transmission also includes a hydraulic switch provided in downstream of the signal-pressure-operated valve to detect a change in the hydraulic pressure due to operation of the signal-pressure-operated valve. When the hydraulic switch detects a change in the hydraulic pressure, the hydraulic pressure of each engaging element is relieved in order to bring the automatic transmission into a neutral state and thereby to escape from the interlock state.

SUMMARY OF THE INVENTION

With the technique disclosed in JP2003-49937, there are provided a plurality of signal-pressure-operated valves and a plurality of hydraulic switches in a hydraulic circuit which supplies hydraulic pressures to frictional engaging elements in order to check whether an interlock state is present in the frictional engaging elements. With the number of gears increasing, there are problems, such as, increase in the number of parts, increase in the size of a control valve body, and complexity of the hydraulic circuit. Further, since the engaging element is not identified in JP2003-49937, it is necessary to enter a neutral state when a failure occurs. As a result, there is a problem that the automatic transmission cannot provide a driving torque after occurrence of failures and provide an ability to drive the vehicle. Accordingly, although the technique disclosed in JP2003-49937 may be able to escape from an interlock state, it is possible that it provides only an inadequate or no driving torque in vehicle restart after vehicle stop after occurrence of failures, resulting in adversely affecting the driving performance under failed conditions.

Accordingly, it is another object of the present invention to provide an automatic transmission which, even when an interlock state occurs, is capable of identifying an abnormal part and escaping from the interlock state.

According to one aspect of the present invention, an automatic transmission comprises: a planetary gear arrangement including a plurality of rotating elements, and including an input rotating element adapted to be connected to a driving source of a vehicle and an output rotating element adapted to be connected to a drive wheel set of the vehicle; a plurality of engaging elements each arranged to vary an engagement state among the rotating elements of the planetary gear arrangement in such a manner to establish at least a normal gear ratio set; and a control section configured to perform the following: selecting a gear from the normal gear ratio set in accordance with a running state of the vehicle under normal operating conditions; controlling the engagement state of each of the engaging elements in such a manner to shift into the selected gear; detecting an interlock state in which one of the engaging elements is incorrectly applied to hold the input rotating element and the output rotating element stationary; establishing, when the interlock state is detected, an escape gear by releasing one of the engaging elements needed to be applied to establish the selected gear; and identifying the incorrectly-applied engaging element in accordance with the running state of the vehicle resulting from establishing the escape gear.

According to another aspect of the invention, a method of controlling an automatic transmission comprises: a planetary gear arrangement including a plurality of rotating elements, and including an input rotating element adapted to be connected to a driving source of a vehicle and an output rotating element adapted to be connected to a drive wheel set of the vehicle; and a plurality of engaging elements each arranged to vary an engagement state among the rotating elements of the planetary gear arrangement in such a manner to establish at least a normal gear ratio set, the method comprising: selecting a gear from the normal gear ratio set in accordance with a running state of the vehicle under normal operating conditions; controlling the engagement state of each of the engaging elements in such a manner to shift into the selected gear; detecting an interlock state in which one of the engaging elements is incorrectly applied to hold the input rotating element and the output rotating element stationary; establishing, when the interlock state is detected, an escape gear by releasing one of the engaging elements needed to be applied to establish the selected gear; and identifying the incorrectly-applied engaging element in accordance with the running state of the vehicle resulting from establishing the escape gear.

BRIEF DESCRIPTION OF THE DRAWINGS

FIG. 14 is a diagram showing in tabular form a relationship among each selected gear, each possible incorrectly applied engaging element, a released engaging element corresponding to the selected gear, and a gear ratio established under such a condition.

DETAILED DESCRIPTION OF THE INVENTION

Figure 1:
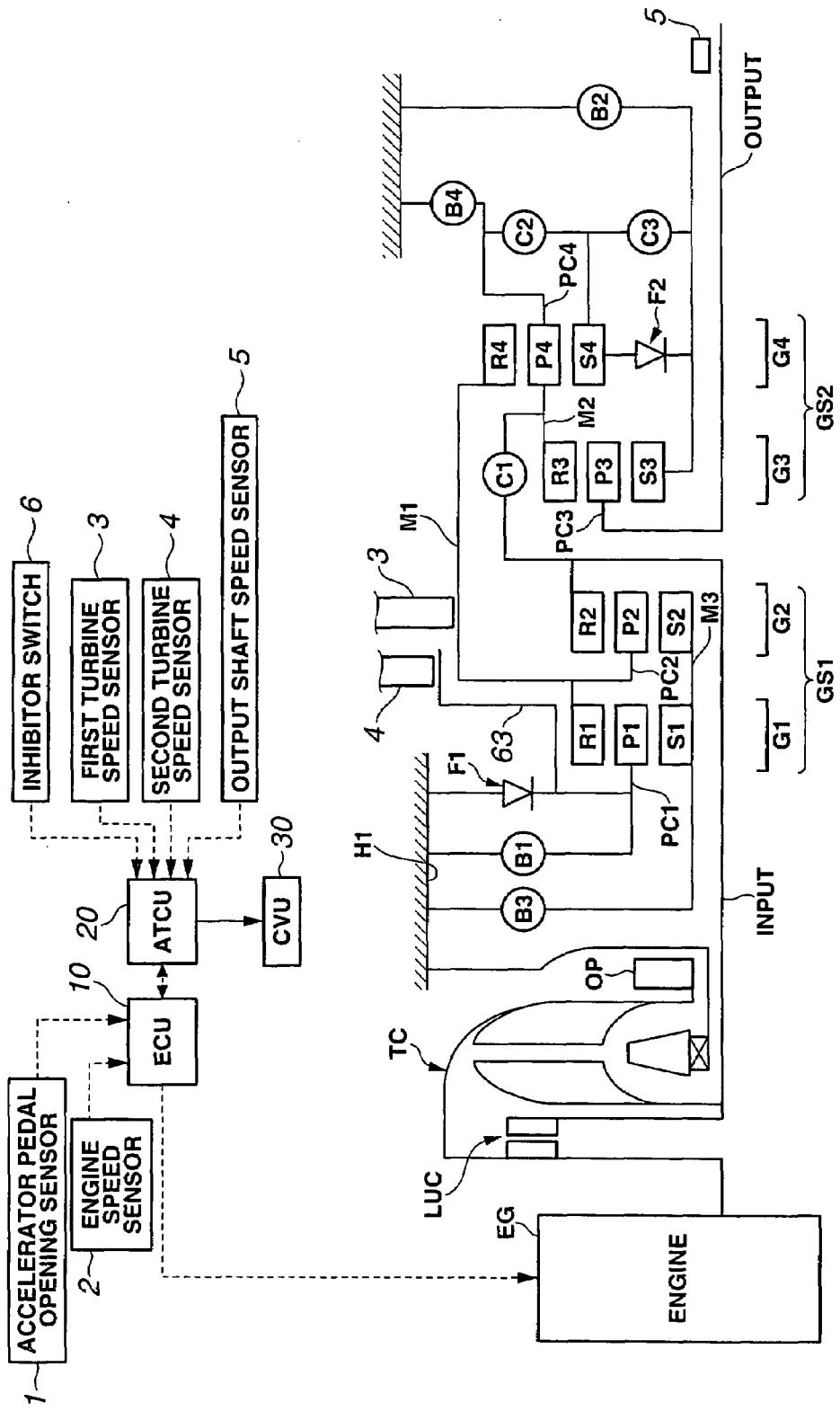
FIG. 1 is a skeleton diagram showing the construction of an automatic transmission provided in a first embodiment, which is adapted for a front-engine rear-drive automotive vehicle to establish seven forward gear ratios and one reverse gear ratio.

In the following description, gears (gear ratios) of a transmission are described as "low", "lower", "high", or "higher". These terms are used to express the magnitude of output speed with respect to input speed in respective gears (gear ratios), not to express the value of their transmission gear ratio, i.e. the value of the ratio of input speed with respect to output speed in respective gears. For example, third gear (third gear ratio) is lower in speed than fifth gear (fifth gear ratio), whereas the value of transmission gear ratio of third gear is larger or higher than that of fifth gear. FIG. 1 is a skeleton diagram showing the construction of an automatic transmission provided in a first embodiment, which is adapted for a front-engine rear-drive automotive vehicle to establish seven forward gear ratios and one reverse gear ratio. FIG. 1 also shows the system configuration of the automatic transmission. As shown in FIG. 1, the automatic transmission provided in the first embodiment is drivingly connected to an engine EG as a driving source via a torque converter TC equipped with a lock-up clutch LUC. Engine EG outputs a torque to drive a pump impeller of torque converter TC and a torque to drive an oil pump OP. In torque converter TC, the driven rotation of the pump impeller stirs an oil to transmit a torque to a turbine runner via a stator, and thereby to drive an input shaft INPUT as an input rotating element. The automatic transmission includes an engine control unit (ECU) 10 configured to control a driving state of engine EG, an automatic transmission control unit (ATCU) 20 configured to control a state of transmission of the automatic transmission, and a control valve unit (CVU) 30 configured to control a hydraulic pressure for each engaging element in accordance with an outputted control signal from ATCU 20. ATCU 20 and CVU 30 serve as a gear shift control section. ECU 10 and ATCU 20 are connected to each other via a CAN (computer area network) communication line, sharing sensor information and control information by signal communication.

ECU 10 is electrically connected to an accelerator pedal opening sensor 1 configured to measure an amount of driver's operation of an accelerator pedal, and also electrically connected to an engine speed sensor 2 configured to measure the output speed of engine EG. ECU 10 controls a fuel injection quantity and a throttle opening based on the engine speed and the accelerator pedal opening, and thereby controls the engine output speed and engine output torque.

ATCU 20 is electrically connected to a first turbine speed sensor 3 configured to measure the rotational speed of a below-described first planet-pinion carrier PC1, a second turbine speed sensor 4 configured to measure the rotational speed of a below-mentioned first ring gear R1, an output shaft speed sensor 5 configured to measure the rotational speed of a below-mentioned output shaft OUTPUT, and an inhibitor switch 6 configured to identify an operating state of a shift lever. The shift lever has range positions P (parking), R (reverse), N (neutral), a normal forward drive range D with which the automatic transmission is subjected to no engine braking, and an engine-braking range with which the automatic transmission is subjected to engine braking.

ATCU 20 includes a below-described input speed computing section configured to compute the rotational speed of input shaft INPUT, and a gear shift control section configured to select an optimal gear from the seven forward gear ratios by map-retrieving based on accelerator pedal opening APO and a vehicle speed Vsp which is computed based on a sensing signal from output shaft speed sensor 5, and to output a control command signal to CVU 30 to establish the selected gear.

<Mechanical construction of the automatic transmission>
The following describes the mechanical construction of the automatic transmission. The automatic transmission includes a first planetary gear arrangement GS1 nearer to input shaft INPUT on its input side (on the left side of FIG. 1) and a second planetary gear arrangement GS2 nearer to output shaft OUTPUT on its output side (on the right side of FIG. 1), which are arranged in a transmission housing H1 as a stationary rotating element. First planetary gear arrangement GS1 includes a first planetary gear G1 and a second planetary gear G2, while second planetary gear arrangement GS2 includes a third planetary gear G3 and a fourth planetary gear G4. The automatic transmission also includes a plurality of frictional engaging elements within transmission housing H1, that is, includes an input clutch C1, a direct clutch C2, a H&LR clutch C3, a front brake B1, a low brake B2, a 2346-brake B3, and a reverse brake B4. The automatic transmission further includes a first one-way clutch F1 and a second one-way clutch F2 in transmission housing H1.

First planetary gear G1 is a simple planetary gear or single-pinion planetary gear, including a first sun gear S1, a first ring gear R1, and a first planet-pinion carrier PC1 carrying a first planet pinion set P1 in meshing contact with first sun gear S1 and with first ring gear R1. Second planetary gear G2 is a simple planetary gear, including a second sun gear S2, a second ring gear R2, and a second planet-pinion carrier PC2 carrying a second planet pinion set P2 in meshing contact with second sun gear S2 and with second ring gear R2. Third planetary gear G3 is a simple planetary gear, including a third sun gear S3, a third ring gear R3, and a third planet-pinion carrier PC3 carrying a third planet pinion set P3 in meshing contact with third sun gear S3 and with third ring gear R3. Fourth planetary gear G4 is a simple planetary gear, including a fourth sun gear S4, a fourth ring gear R4, and a fourth planet-pinion carrier PC4 carrying a fourth planet pinion set P4 in meshing contact with fourth sun gear S4 and with fourth ring gear R4.

Input shaft INPUT is drivingly connected to second ring gear R2 to transmit a driving torque from engine EG to second ring gear R2 via torque converter TC, etc, while output shaft OUTPUT is drivingly connected to third planet-pinion carrier PC3 to transmit a driving torque from third planet-pinion carrier PC3 to a drive wheel set not shown via a final gear not shown.

Some of the rotating elements of the four planetary gears are interconnected via three connection members, i.e. a first connection member M1, a second connection member M2, and a third connection member M3. First connection member M1 solidly couples first ring gear R1, second planet-pinion carrier PC2, and fourth ring gear R4. Second connection member M2 solidly couples third ring gear R3, and fourth planet-pinion carrier PC4. Third connection member M3 solidly couples first sun gear S1, and second sun gear S2.

As described above, first planetary gear arrangement GS1 includes first planetary gear G1 and second planetary gear G2 which are interconnected via first connection member M1 and via third connection member M3, so that first planetary gear arrangement GS1 includes four independent rotating elements. On the other hand, second planetary gear arrangement GS2 includes third planetary gear G3 and fourth planetary gear G4 which are interconnected via second connection member M2, so that second planetary gear arrangement GS2 includes five independent rotating elements.

First planetary gear arrangement GS1 includes a path for torque transmission between input shaft INPUT and second ring gear R2. The torque inputted to first planetary gear arrangement GS1 is outputted to second planetary gear arrangement GS2 via first connection member M1. Second planetary gear arrangement GS2 includes a path for torque transmission between input shaft INPUT and second connection member M2, and a path for torque transmission between first connection member M1 and fourth ring gear R4. The torque inputted to second planetary gear arrangement GS2 is outputted to output shaft OUTPUT via third planet-pinion carrier PC3. With H&LR clutch C3 released, second one-way clutch F2 inhibits a relative forward rotation of third sun gear S3 with respect to fourth sun gear S4. While the rotational speed of fourth sun gear S4 exceeds the rotational speed of third sun gear S3, third planetary gear G3 and fourth planetary gear G4 have independent gear ratios, connected to each other via second connection member M2.

Input clutch C1 selectively connects and disconnects (engages and disengages) input shaft INPUT and second connection member M2. Direct clutch C2 selectively connects and disconnects fourth sun gear S4 and fourth planet-pinion carrier PC4. H&LR clutch C3 selectively connects and disconnects third sun gear S3 and fourth sun gear S4. Second one-way clutch F2 is disposed between third sun gear S3 and fourth sun gear S4.

Front brake B1 selectively holds stationary against rotation first planet-pinion carrier PC1 to transmission housing H1 and releases first planet-pinion carrier PC1 from transmission housing H1. First one-way clutch F1 is arranged in parallel with front brake B1. Low brake B2 selectively holds stationary against rotation and releases third sun gear S3. 2346-brake B3 selectively holds stationary against rotation and releases third connection member M3 (first sun gear S1 and second sun gear S2). Reverse brake B4 selectively holds stationary against rotation and releases fourth planet-pinion carrier PC4.

Figure 9:
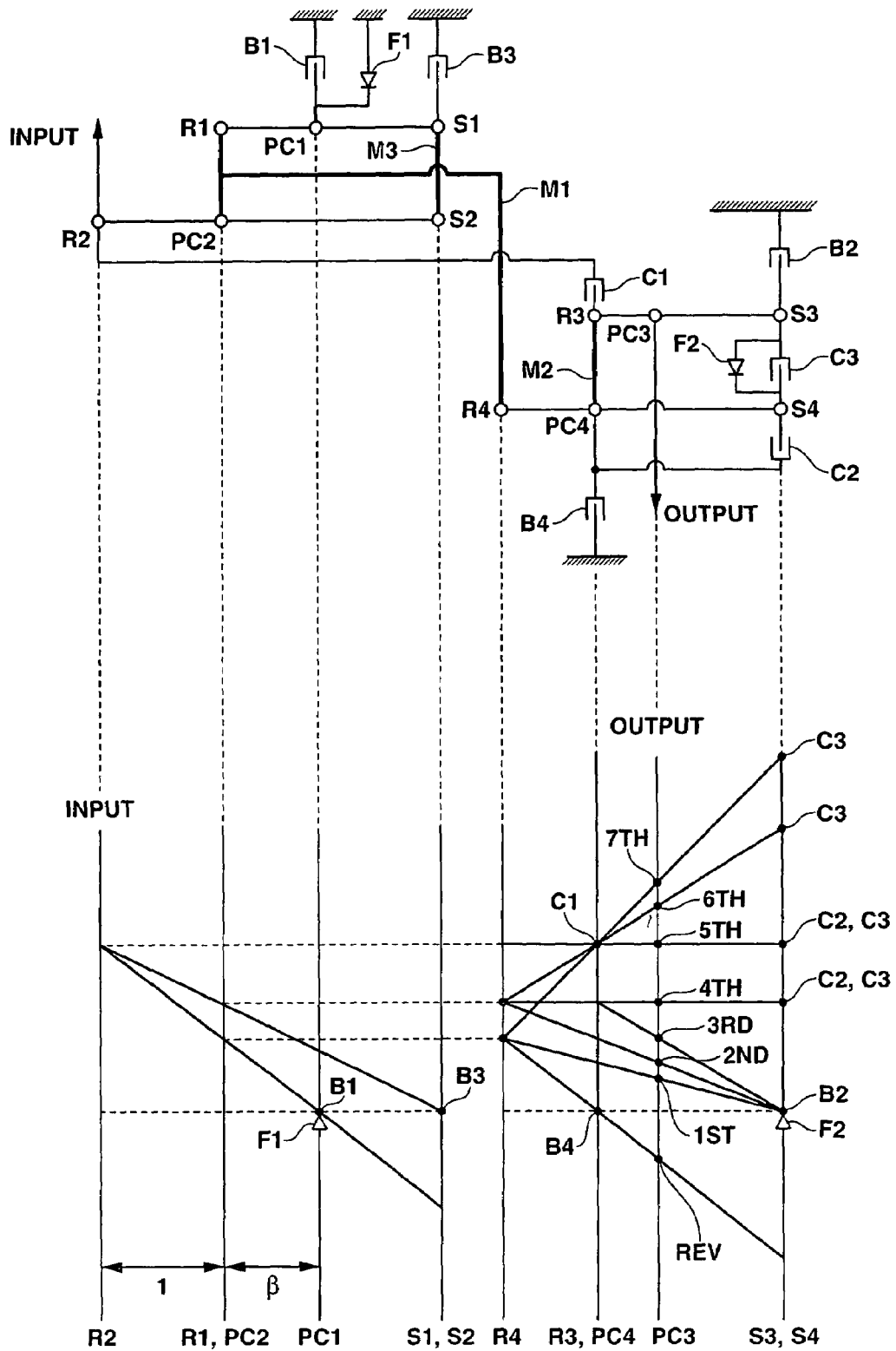
FIG. 9 is a speed relationship diagram (lever diagram) showing the rotational speed of rotating elements of the automatic transmission provided in the first embodiment when establishing each of the seven forward gear ratios and one reverse gear ratio.

<Computation of the turbine speed> In consideration that input shaft INPUT is connected to second ring gear R2, and that first planetary gear arrangement GS1 comprises first planetary gear G1 and second planetary gear G2 which are interconnected via the two connection members, the input speed computing section of ATCU 20 is configured to determine the rotational speed of input shaft INPUT by a computing process using the sensing signals from first turbine speed sensor 3 and second turbine speed sensor 4. Specifically, the input speed is calculated using the following equation:

$$N(R2) = (1+1/\beta) \cdot N(PC2) - (1/\beta) \cdot N(PC1)$$

where:

N(PC1) represents the rotational speed of first planet-pinion carrier PC1;

N(PC2) represents the rotational speed of second planet-pinion carrier PC2;

N(R2) represents the rotational speed of second ring gear R2; and

β represents the gear ratio between first ring gear R1 (second planet-pinion carrier PC2) and first planet-pinion carrier PC1, normalized by the gear ratio between second ring gear R2 and second planet-pinion carrier PC2 (first ring gear R1) as shown in the speed relationship diagram of FIG. 9.

The rotational speed of second planet-pinion carrier PC2 is detected by first turbine speed sensor 3, while the rotational speed of first planet-pinion carrier PC1 is detected by second turbine speed sensor 4 which detects the rotational speed of a sensing target member 63 coupled to first planet-pinion carrier PC1. Thus, the rotational speed of second ring gear R2 (the rotational speed of input shaft INPUT, referred to as "turbine speed") is obtained.

Figure 2:
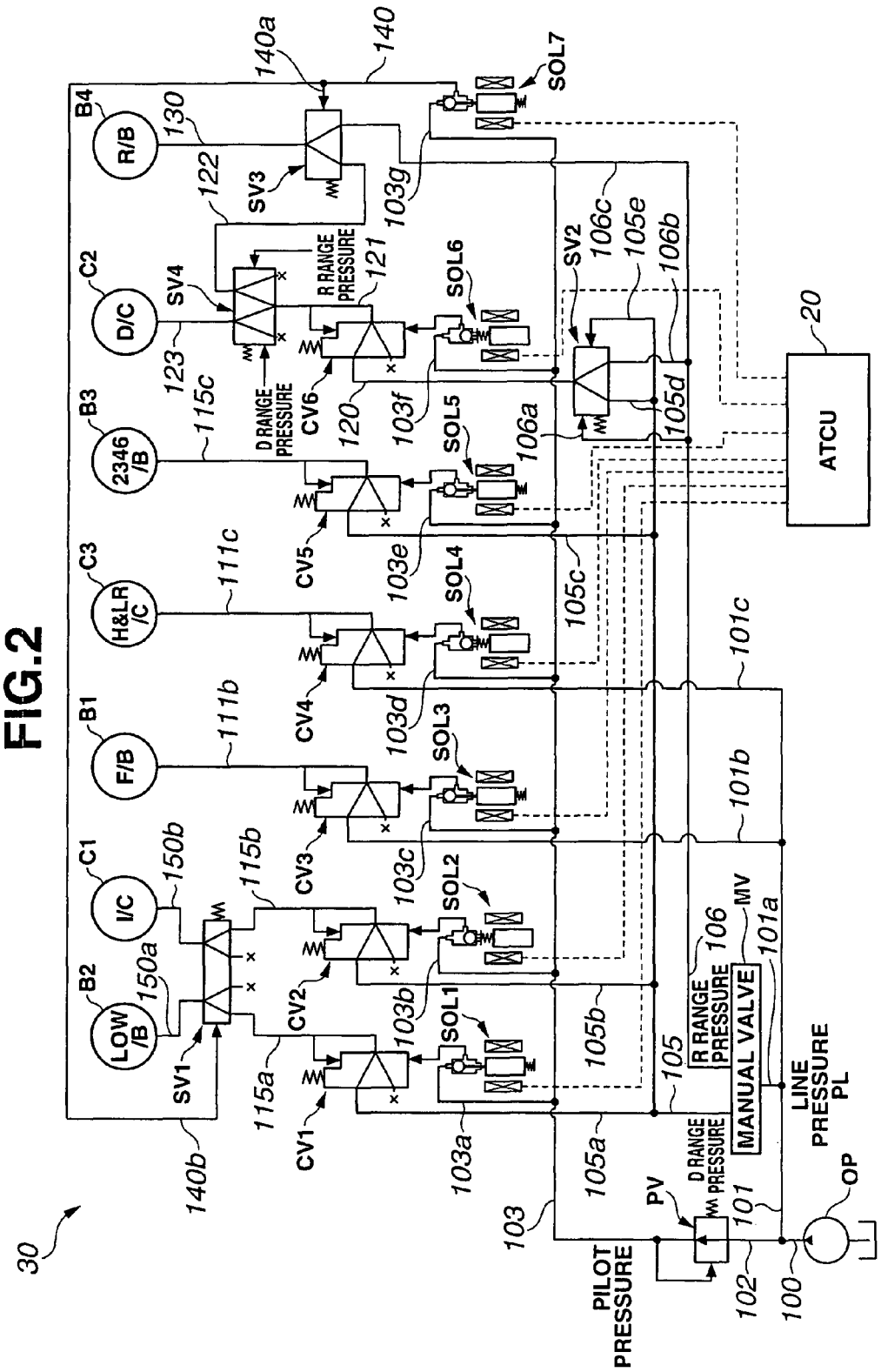
FIG. 2 is a circuit diagram showing a hydraulic circuit of a control valve unit provided in the first embodiment.

<Construction of the control valve unit> FIG. 2 is a circuit diagram showing a hydraulic circuit of CVU 30. The hydraulic circuit includes oil pump OP which is driven by engine EG to serve as a source of hydraulic pressure, a manual valve MV which is operated in response to operation of the shift lever to direct a line pressure PL, and a pilot valve PV which decompresses the line pressure to a predetermined constant pressure.

The hydraulic circuit includes a first pressure regulating valve CV1 which regulates the apply pressure of low brake B2, a second pressure regulating valve CV2 which regulates the apply pressure of input clutch C1, a third pressure regulating valve CV3 which regulates the apply pressure of front brake B1, a fourth pressure regulating valve CV4 which regulates the apply pressure of H&RL clutch C3, a fifth pressure regulating valve CV5 which regulates the apply pressure of 2346-brake B3, and a sixth pressure regulating valve CV6 which regulates the apply pressure of direct clutch C2.

The hydraulic circuit includes a first directional control valve SV1 which provides fluid communication selectively in a first path between low brake B2 and a fluid supply passage and in a second path between input clutch C1 and a fluid supply passage, a second directional control valve SV2 which provides fluid communication selectively in a first path between direct clutch C2 and a supply fluid passage of a D range pressure and in a second path between direct clutch C2 and a supply fluid passage of an R range pressure, a third directional control valve SV3 which provides fluid communication selectively in a first path between reverse brake B4 and a supply fluid passage from sixth pressure regulating valve CV6 and in a second path between reverse brake B4 and a supply fluid passage of the R range pressure, and a fourth directional control valve SV4 which provides fluid communication selectively in a first path between direct clutch C2 and a fluid supply passage from sixth pressure regulating valve CV6 and in a second path between reverse brake B4 and sixth pressure regulating valve CV6.

The hydraulic circuit includes a first solenoid valve SOL1, a second solenoid valve SOL2, a third solenoid valve SOL3, a fourth solenoid valve SOL4, a fifth solenoid valve SOL5, a sixth solenoid valve SOL6, and a seventh solenoid valve SOL7, each of which operates in response to a control signal from ATCU 20. First solenoid valve SOL1 is configured to output a pressure regulating signal to first pressure regulating valve CV1. Second solenoid valve SOL2 is configured to output a pressure regulating signal to second pressure regulating valve CV2. Third solenoid valve SOL3 is configured to output a pressure regulating signal to third pressure regulating valve CV3. Fourth solenoid valve SOL4 is configured to output a pressure regulating signal to fourth pressure regulating valve CV4. Fifth solenoid valve SOL5 is configured to output a pressure regulating signal to fifth pressure regulating valve CV5. Sixth solenoid valve SOL6 is configured to output a pressure regulating signal to sixth pressure regulating valve CV6. Seventh solenoid valve SOL7 is configured to output switching signals to first directional control valve SV1 and third directional control valve SV3. Of these, solenoid valve SOL2, SOL5 and SOL6 are three-way proportional electromagnetic valves, each of which includes a first port to receive the pilot pressure, a second port connected to a drain circuit, and a third port connected to a receiver section of an associated one of the pressure regulating valves. Solenoid valves SOL1, SOL3, and SOL4 are two-way proportional electromagnetic valves, each of which includes a first port to receive the pilot pressure, and a third port connected to a receiver section of an associated one of the pressure regulating valves. Seventh solenoid valve SOL7 is a three-way on-off electromagnetic valve, including a first port to receive the pilot pressure, a second port connected to a drain passage, and a third port connected to a receiver section of first directional control valve SV1 and third directional control valve SV3. First solenoid valve SOL1, third solenoid valve SOL3, fifth solenoid valve SOL5 and seventh solenoid valve SOL7 are of a normally closed type (opened while energized and closed while de-energized), while second solenoid valve SOL2, fourth solenoid valve SOL4 and sixth solenoid valve SOL6 are of a normally open type (opened while de-energized and closed while energized).

<Fluid passage construction> The discharge pressure of oil pump OP driven by engine EG is regulated as line pressure PL, and then supplied to fluid passage 101 and fluid passage 102 via fluid passage 100. Fluid passage 101 is connected to a fluid passage 101a connected to manual valve MV which operates in synchronization with the shift lever operation of a driver, to a fluid passage 101b which supplies a base pressure for the apply pressure of front brake B1, and to a fluid passage 101c which supplies a base pressure for the apply pressure of H&LR clutch C3. Manual valve MV is hydraulically connected to a fluid passage 105, and a fluid passage 106 which supplies the R range pressure in reverse gear, and is operated to direct the line pressure selectively to fluid passage 105 or fluid passage 106 in accordance with gearshift operation. Fluid passage 105 is connected to a fluid passage 105a which supplies a base pressure for the apply pressure of low brake B2, a fluid passage 105b which supplies a base pressure for the apply pressure of input clutch C1, a fluid passage 105c which supplies a base pressure for the apply pressure of 2346-brake B3, a fluid passage 105d which supplies a base pressure for the apply pressure of direct clutch C2, and a fluid passage 105e which supplies a switching pressure for second directional control valve SV2. Fluid passage 106 is connected to a fluid passage 106a which supplies a switching pressure for second directional control valve SV2, a fluid passage 106b which supplies a base pressure for the apply pressure of direct clutch C2, and a fluid passage 106c which supplies the apply pressure of reverse brake B4. Fluid passage 102 is connected via pilot valve PV to a fluid passage 103 which supplies the pilot pressure. Fluid passage 103 is connected to a fluid passage 103a which supplies the pilot pressure to first solenoid valve SOL1, a fluid passage 103b which supplies the pilot pressure to second solenoid valve SOL2, a fluid passage 103c which supplies the pilot pressure to third solenoid valve SOL3, a fluid passage 103d which supplies the pilot pressure to fourth solenoid valve SOL4, a fluid passage 103e which supplies the pilot pressure to fifth solenoid valve SOL5, a fluid passage 103 which supplies the pilot pressure to sixth solenoid valve SOL6, and a fluid passage 103g which supplies the pilot pressure to seventh solenoid valve SOL7.

Figure 3:
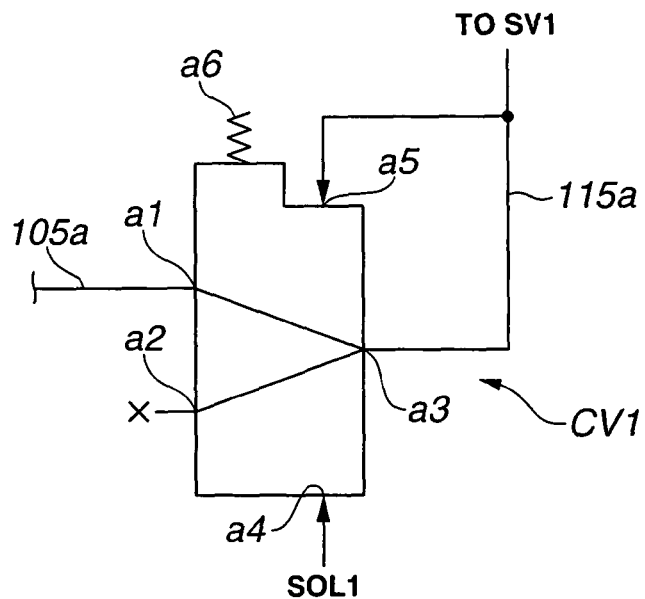
FIG. 3 is a schematic diagram showing the construction of a first pressure regulating valve provided in the first embodiment.

FIG. 3 is a schematic diagram showing the construction of first pressure regulating valve CV1. As shown in FIG. 3, first pressure regulating valve CV1 includes a first port a1 connected to fluid passage 105a, a second port a2 connected to the drain circuit, a third port a3 connected to fluid passage 115a connected to first directional control valve SV1, a fourth port a4 to receive a signal pressure from first solenoid valve SOL1, a fifth port a5 connected to a passage branched from fluid passage 115a to receive a pressure opposed to the signal pressure of fourth port a4, and a first spring a6 which acts against the signal pressure. In FIG. 3, when first pressure regulating valve CV1 is displaced upward to an established upward position, fluid communication is allowed between fluid passage 105a and fluid passage 115a. Conversely, when first pressure regulating valve CV1 is displaced downward to an established downward position, fluid communication is allowed between fluid passage 115a and the drain circuit. Pressure regulating valves CV2, CV3, CV4, CV5 and CV6 are similarly constructed as first pressure regulating valve CV1, including the ports a1, a2, a3, a4 and a5, and spring a6.

Figure 4:
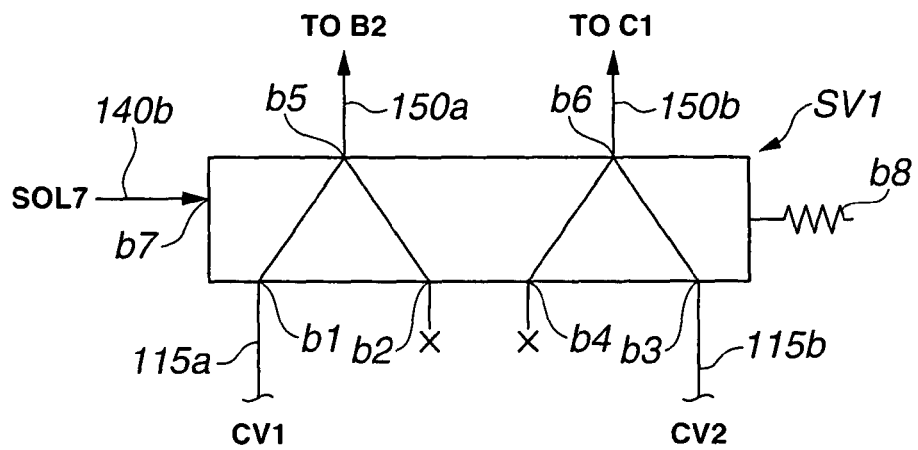
FIG. 4 is a schematic diagram showing the construction of a first directional control valve provided in the first embodiment.

FIG. 4 is a schematic diagram showing the construction of first directional control valve SV1. As shown in FIG. 4, first directional control valve SV1 includes a first port b1 connected to fluid passage 115a, a second port b2 connected to the drain circuit, and a third port b3 connected to fluid passage 115b, a fourth port b4 connected to the drain circuit, and a fifth port b5 connected to fluid passage 150a which supplies a hydraulic pressure to low brake B2, a sixth port b6 connected to fluid passage 150b which supplies a hydraulic pressure to input clutch C1, a seventh port b7 connected to fluid passage 140b which supplies the signal pressure from seventh solenoid valve SOL7, and a spring b8 which acts against the signal pressure supplied to seventh port b7. In FIG. 4, when first directional control valve SV1 is displaced leftward to an established left position, fluid communication is allowed between fluid passage 115a and fluid passage 150a, while fluid communication is allowed between fluid passage 150b and the drain circuit. Conversely, when first directional control valve SV1 is displaced rightward to an established right position, fluid communication is allowed between fluid passage 150a and the drain circuit, while fluid communication is allowed between fluid passage 115b and fluid passage 150b.

Figure 5:
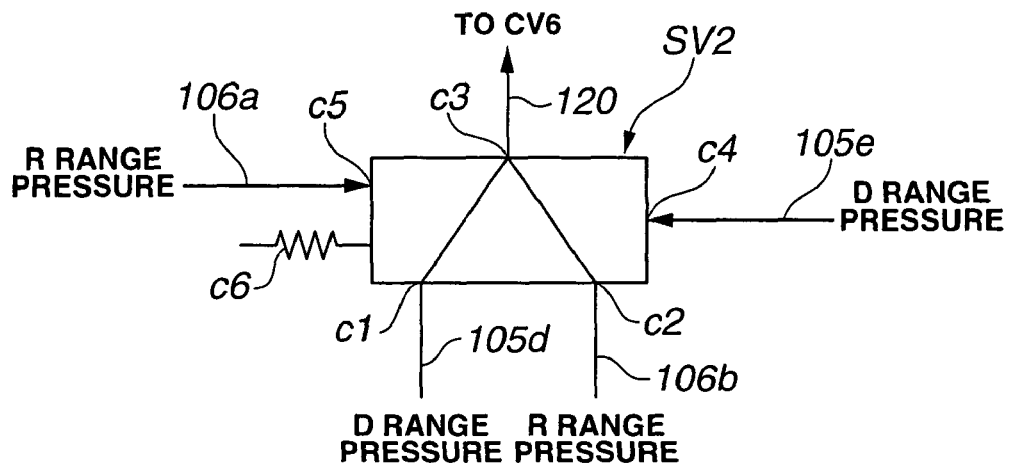
FIG. 5 is a schematic diagram showing the construction of a second directional control valve provided in the first embodiment.

FIG. 5 is a schematic diagram showing the construction of second directional control valve SV2. As shown in FIG. 5, second directional control valve SV2 includes a first port c1 connected to fluid passage 105d which supplies the D range pressure, a second port c2 connected to fluid passage 106d which supplies the R range pressure, a third port c3 connected to fluid passage 120 which supplies hydraulic pressure to sixth pressure regulating valve CV6, a fourth port c4 connected to fluid passage 105e which supplies the D range pressure, a fifth port c5 connected to fluid passage 106a which supplies the R range pressure, and a spring c6 which acts against the hydraulic pressure supplied to the fourth port c4. In FIG. 5, when second directional control valve SV2 is displaced rightward to an established right position, fluid communication is allowed between fluid passage 106b and fluid passage 120. Conversely, when second directional control valve SV2 is displaced leftward to an established left position, fluid communication is allowed between fluid passage 105d and fluid passage 120.

Figure 6:
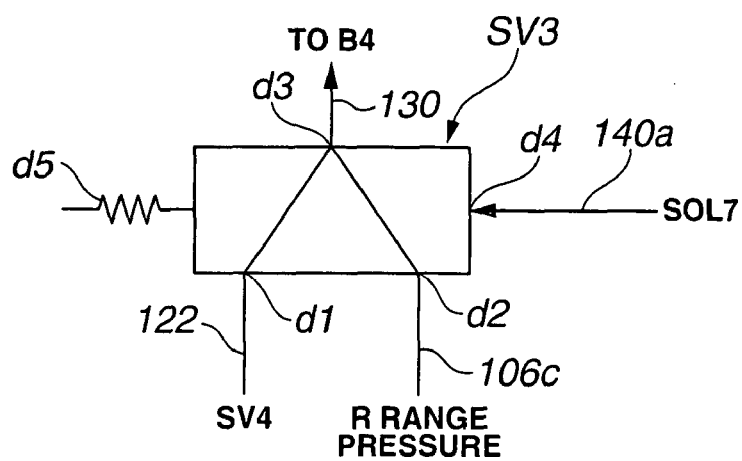
FIG. 6 is a schematic diagram showing the construction of a third directional control valve provided in the first embodiment.

FIG. 6 is a schematic diagram showing the construction of third directional control valve SV3. As shown in FIG. 6, third directional control valve SV3 includes a first port d1 connected to fluid passage 122 which supplies the hydraulic pressure from fourth directional control valve SV4, a second port d2 connected to fluid passage 106c which supplies the R range pressure, a third port d3 connected to fluid passage 130 which supplies hydraulic pressure to reverse brake B4, and a fourth port d4 connected with fluid passage 140a which supplies the signal pressure of valve SOL7, and a spring d5 which acts against the hydraulic pressure supplied to fourth port d4. In FIG. 6, when third directional control valve SV3 is displaced rightward to an established right position, fluid communication is allowed between fluid passage 106c and fluid passage 130. Conversely, when third directional control valve SV3 is displaced leftward to an established left position, fluid communication is allowed between fluid passage 122 and fluid passage 130.

Figures 7, 8:
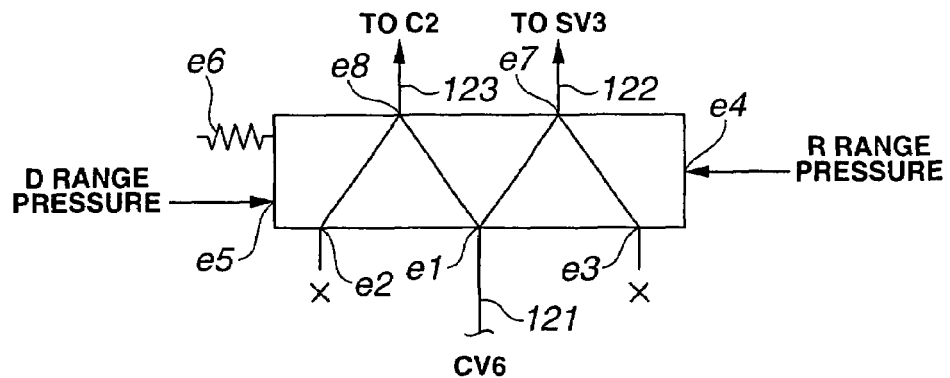
FIG. 7 is a schematic diagram showing the construction of a fourth directional control valve provided in the first embodiment.
FIG. 8 is a diagram showing in tabular form a set of clutch and brake engagements required to establish each of the seven forward gear ratios and the one reverse gear ratio in the automatic transmission provided in the first embodiment.

FIG. 7 is a schematic diagram showing the construction of fourth directional control valve SV4. As shown in FIG. 7, fourth directional control valve SV4 includes a first port e1 connected with fluid passage 121 which supplies the hydraulic pressure from sixth pressure regulating valve CV6, a second port e2 connected to the drain circuit, a third port e3 connected to the drain circuit, a fourth port e4 which receives the R range pressure, a fifth port e5 which receive the D range pressure, a spring e6 which acts against the hydraulic pressure supplied to the fourth port e4, a seventh port e7 connected to fluid passage 122, and an eighth port e8 connected to fluid passage 123. In FIG. 7, when fourth directional control valve SV4 is displaced rightward to an established right position, fluid communication is allowed between fluid passage 121 and fluid passage 123 while fluid communication is allowed between fluid passage 122 and the drain circuit. Conversely, when fourth directional control valve SV4 is displaced leftward to an established left position, fluid communication is allowed between fluid passage 121 and fluid passage 122, while fluid communication is allowed between fluid passage 123 and the drain circuit.

As shown in the clutch and brake engagement operation table of FIG. 8, the apply pressure (indicated by open circles) and the release pressure (indicated by blank) are supplied to clutches C1, C2 and C3 and brakes B1, B2, B3 and B4 to establish each of the seven forward gear ratios and one reverse gear ratio under normal operating conditions.

Figures 10, 11:
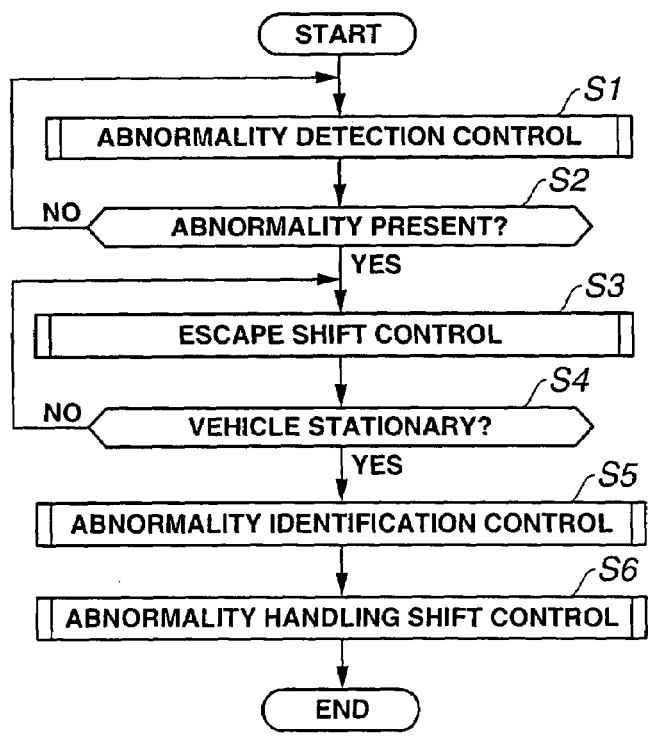
FIG. 10 is a diagram showing in tabular form a set of operational states of solenoid valves required to establish each of the seven forward gear ratios and the one reverse gear ratio in the automatic transmission provided in the first embodiment.
FIG. 11 is a flow chart showing an outline of a process of failure detection and failure handling provided in the first embodiment.

<Gear shift operation> The following describes gear shift operation of the automatic transmission. FIG. 8 is a diagram showing in tabular form a set of clutch and brake engagements required to establish each of the seven forward gear ratios and the one reverse gear ratio in the automatic transmission provided in the first embodiment. FIG. 9 is a speed relationship diagram (lever diagram) showing the rotational speed of rotating elements of the automatic transmission provided in the first embodiment when establishing each of the seven forward gear ratios and one reverse gear ratio. FIG. 10 is a diagram showing in tabular form a set of operational states of solenoid valves required to establish each of the seven forward gear ratios and the one reverse gear ratio in the automatic transmission provided in the first embodiment.

<First gear> In first gear, two different sets of engaging elements are applied under engine braking (when the engine braking range is selected) and under no engine braking (when the normal forward drive range is selected), respectively. In engine braking range first gear, front brake B1, low brake B2 and H&LR clutch C3 are applied as shown by a set of open circles including those enclosed by parentheses in FIG. 8. First one-way clutch F1, which is provided in parallel with front brake B1, and second one-way clutch F2, which is provided in parallel with H&LR clutch C3, also serve for torque or power transmission. In normal drive range first gear, low brake B2 is applied, and front brake B1 and H&LR clutch C3 are released, where the torque or power is transmitted by first one-way clutch F1 and second one-way clutch F2.

In first gear, front brake B1 is applied in the engine braking range, or first planet-pinion carrier PC1 is held stationary by first one-way clutch F1 in the normal drive range. Under this condition, the rotation inputted from input shaft INPUT into second ring gear R2 is slowed down by first planetary gear arrangement GS1. The slowed-down rotation is transmitted from first planetary gear arrangement GS1 to fourth ring gear R4 of second planetary gear arrangement GS2 via first connection member M1. On the other hand, low brake B2 and H&LR clutch C3 are applied in engine braking range first gear, or low brake B2 and second one-way clutch F2 are applied in normal drive range first gear. Under this condition, the rotation inputted into fourth ring gear R4 is slowed down by second planetary gear arrangement GS2, and is outputted from third planet-pinion carrier PC3 to output shaft OUTPUT.

In the speed relationship diagram of FIG. 9, first gear is defined by the engagement point of front brake B1 to define how the input speed from engine is reduced in first planetary gear arrangement GS1, and is defined by the engagement point of low brake B2 to define how the slowed-down rotation from first planetary gear arrangement GS1 is further slowed down in second planetary gear arrangement GS2. Thus, the rotation inputted from input shaft INPUT is slowed down and outputted from output shaft OUTPUT. Herein, an engagement point is defined as a point which indicates the rotational speed of a rotating element associated with a subject engaging element when the engaging element is applied.

In first gear, the torque or power flows through front brake B1 (or first one-way clutch F1), low brake B2, H&LR clutch C3 (or second one-way clutch F2), first connection member M1, second connection member M2, and third connection member M3. Thus, first planetary gear arrangement GS1 and second planetary gear arrangement GS2 serve for torque transmission.

As shown in the solenoid valve operation table of FIG. 10, in normal drive range first gear, first, second, third, sixth and seventh solenoid valves SOL1, SOL2, SOL3, SOL6 and SOL7 are energized to be ON and the remaining solenoid valves are de-energized to be OFF, to supply the apply pressures to a desired set of engaging elements. When seventh solenoid valve SOL7 is ON, first directional control valve SV1 is displaced leftward in FIG. 2 so that fluid communication is allowed between first pressure regulating valve CV1 and low brake B2 while input clutch C1 is connected to the drain circuit. This is effective for preventing an interlock state failure therebetween. On the other hand, second directional control valve SV2 is displaced leftward in FIG. 2, receiving the D range pressure at fourth port c4. Upon this, fluid communication is allowed between first port c1 and third port c3 of second directional control valve SV2 so that the D range pressure acts on sixth pressure regulating valve CV6. At this time, sixth pressure regulating valve CV6 is displaced downward in FIG. 2. As a result, the D range pressure is not supplied to direct clutch C2 nor to fourth directional control valve SV4. Fourth directional control valve SV4 is displaced rightward, receiving the D range pressure, to allow fluid communication between fluid passages 121 and 123 but not to serve for engagement of direct clutch C2. Third directional control valve SV3 is displaced leftward, receiving the signal pressure at fourth port d4 from seventh solenoid valve SOL7. Upon this, although fluid communication is allowed between first port d1 and third port d3 in third directional control valve SV3, no hydraulic pressure is supplied to fluid passage 122, and thereby no hydraulic pressure is supplied to reverse brake B4.

<Second gear> In second gear, two different sets of engaging elements are applied under engine braking (when the engine braking range is selected) and under no engine braking (when the normal forward drive range is selected), respectively, similarly as in the case of first gear. In engine braking range second gear, low brake B2, 2346-brake B3 and H&LR clutch C3 are applied as shown by a set of open circles including those enclosed by parentheses in FIG. 8. Second one-way clutch F2, which is provided in parallel with H&LR clutch C3, also serves for torque transmission. In normal drive range second gear, low brake B2 and 2346-brake B3 are applied, and H&LR clutch C3 is released, where the torque or power is transmitted by second one-way clutch F2.

In second gear, with 2346-brake B3 applied, the rotation inputted from input shaft INPUT into second ring gear R2 is slowed down only by second planetary gear G2 in first planetary gear arrangement GS1. The slowed-down rotation is transmitted from first planetary gear arrangement GS1 to fourth ring gear R4 of second planetary gear arrangement GS2 via first connection member M1. On the other hand, low brake B2 and H&LR clutch C3 are applied in engine braking range second gear, or low brake B2 and second one-way clutch F2 are applied in normal drive range second gear. Under this condition, the rotation inputted into fourth ring gear R4 is slowed down by second planetary gear arrangement GS2, and is outputted from third planet-pinion carrier PC3 to output shaft OUTPUT.

In the speed relationship diagram of FIG. 9, second gear is defined by the engagement point of 2346-brake B3 to define how the input speed from engine is reduced in first planetary gear arrangement GS1, and is defined by the engagement point of low brake B2 to define how the slowed-down rotation from first planetary gear arrangement GS1 is further slowed down in second planetary gear arrangement GS2. Thus, the rotation inputted from input shaft INPUT is slowed down and outputted from output shaft OUTPUT.

In second gear, the torque or power flows through 2346-brake B3, low brake B2, H&LR clutch C3 (or second one-way clutch F2), first connection member M1, second connection member M2, and third connection member M3. Thus, second planetary gear G2 and second planetary gear arrangement GS2 serve for torque transmission.

The upshift from first gear into second gear is implemented by releasing front brake B1 in advance, and then starting to apply 2346-brake B3, so that first one-way clutch F1 is released after the torque capacity of 2346-brake B3 is fully obtained. This operation is effective for enhancing the accuracy of the gear shift sequence or timings.

As shown in the solenoid valve operation table of FIG. 10, in normal drive range second gear, first, second, fifth, sixth and seventh solenoid valves SOL1, SOL2, SOL5, SOL6 and SOL7 are energized to be ON and the remaining solenoid valves are de-energized to be OFF, to supply the apply pressures to a desired set of engaging elements. When seventh solenoid valve SOL7 is ON, first directional control valve SV1 is displaced leftward in FIG. 2 so that fluid communication is allowed between first pressure regulating valve CV1 and low brake B2 while input clutch C1 is connected to the drain circuit. This is effective for preventing an interlock state failure therebetween. On the other hand, second directional control valve SV2 is displaced leftward in FIG. 2, receiving the D range pressure at fourth port c4. Upon this, fluid communication is allowed between first port c1 and third port c3 of second directional control valve SV2 so that the D range pressure acts on sixth pressure regulating valve CV6. At this time, sixth pressure regulating valve CV6 is displaced downward in FIG. 2. As a result, the D range pressure is not supplied to direct clutch C2 nor to fourth directional control valve SV4. Third directional control valve SV3 is displaced leftward, receiving the signal pressure at fourth port d4 from seventh solenoid valve SOL7. Upon this, although fluid communication is allowed between first port d1 and third port d3 in third directional control valve SV3, no hydraulic pressure is supplied to fluid passage 122, and thereby no hydraulic pressure is supplied to reverse brake B4.

<Third gear> In third gear, low brake B2, 2346-brake B3 and direct clutch C2 are applied as shown by a set of open circles in FIG. 8.

In third gear, with 2346-brake B3 applied, the rotation inputted from input shaft INPUT into second ring gear R2 is slowed down by second planetary gear G2 in first planetary gear arrangement GS1. This slowed-down rotation is transmitted from first planetary gear arrangement GS1 to fourth ring gear R4 of second planetary gear arrangement GS2 via first connection member M1. On the other hand, with direct clutch C2 applied, the rotating elements of fourth planetary gear G4 rotate as a unit. Further, with low brake B2 applied, the rotation fourth planet-pinion carrier PC4 which is rotating as a unit with fourth ring gear R4 is inputted to third ring gear R3 via second connection member M2, is slowed down by third planetary gear G3, and is outputted from third planet-pinion carrier PC3 to output shaft OUTPUT. Thus, fourth planetary gear G4 does not serve for speed reduction, although serving for torque transmission.

In the speed relationship diagram of FIG. 9, third gear is defined by the engagement point of 2346-brake B3 to define how the input speed from engine is reduced in first planetary gear arrangement GS1, and is defined by the engagement point of low brake B2 to define how the slowed-down rotation from first planetary gear arrangement GS1 is further slowed down in second planetary gear arrangement GS2. Thus, the rotation inputted from input shaft INPUT is slowed down and outputted from output shaft OUTPUT.

In third gear, the torque or power flows through 2346-brake B3, low brake B2, direct clutch C2, first connection member M1, second connection member M2, and third connection member M3. Thus, second planetary gear G2 and second planetary gear arrangement GS2 serve for torque transmission.

The upshift from second gear to third gear is implemented by releasing H&LR clutch C3 in advance, and then starting to apply direct clutch C2, so that second one-way clutch F2 is released after the torque capacity of direct clutch C2 is fully obtained. This operation is effective for enhancing the accuracy of the gear shift sequence or timings.

As shown in the solenoid valve operation table of FIG. 10, in third gear, first, second, fourth, fifth and seventh solenoid valves SOL1, SOL2, SOL4, SOL5 and SOL7 are energized to be ON and the remaining solenoid valves are de-energized to be OFF, to supply the apply pressures to a desired set of engaging elements. When seventh solenoid valve SOL7 is ON, first directional control valve SV1 is displaced leftward in FIG. 2 so that fluid communication is allowed between first pressure regulating valve CV1 and low brake B2 while input clutch C1 is connected to the drain circuit. This is effective for preventing an interlock state failure therebetween. On the other hand, second directional control valve SV2 is displaced leftward in FIG. 2, receiving the D range pressure at fourth port c4. Sixth pressure regulating valve CV6 is displaced upward in FIG. 2. As a result, a regulated hydraulic pressure is supplied to fourth directional control valve SV4. Fourth directional control valve SV4 is displaced rightward, receiving the D range pressure, to allow fluid communication between fluid passages 121 and 123 and to connect fluid passage 122 to the drain circuit. Accordingly, a hydraulic pressure is supplied to direct clutch C2 while no hydraulic pressure is supplied to third directional control valve SV3 via fluid passage 122. Third directional control valve SV3 is displaced leftward, receiving the signal pressure at fourth port d4 from seventh solenoid valve SOL7. Upon this, although fluid communication is allowed between first port d1 and third port d3 in third directional control valve SV3, no hydraulic pressure is supplied to fluid passage 122, and thereby no hydraulic pressure is supplied to reverse brake B4.

<Fourth gear> In fourth gear, 2346-brake B3, direct clutch C2 and H&LR clutch C3 are applied as shown by a set of open circles in FIG. 8.

In fourth gear, with 2346-brake B3 applied, the rotation inputted from input shaft INPUT into second ring gear R2 is slowed down only by second planetary gear G2 in first planetary gear arrangement GS1. The slowed-down rotation is transmitted from first planetary gear arrangement GS1 to fourth ring gear R4 of second planetary gear arrangement GS2 via first connection member M1. On the other hand, with direct clutch C2 and H&LR clutch C3 applied, the rotating elements of second planetary gear arrangement GS2 rotate as a unit. Under this condition, the rotation inputted into fourth ring gear R4 is outputted without speed reduction from third planet-pinion carrier PC3 to output shaft OUTPUT.

In the speed relationship diagram of FIG. 9, fourth gear is defined by the engagement point of 2346-brake B3 to define how the input speed from engine is reduced in first planetary gear arrangement GS1, and is defined by the line connecting the engagement point of direct clutch C2 and the engagement point of H&LR clutch C3 to define that the slowed-down rotation transmitted from second planetary gear G2 is outputted without speed reduction. Thus, the rotation inputted from input shaft INPUT is slowed down and outputted from output shaft OUTPUT.

In fourth gear, the torque or power flows through 2346-brake B3, direct clutch C2, H&LR clutch C3, first connection member M1, second connection member M2, and third connection member M3. Thus, second planetary gear G2 and second planetary gear arrangement GS2 serve for torque transmission.

As shown in the solenoid valve operation table of FIG. 10, in fourth gear, second and fifth solenoid valves SOL2 and SOL5 are energized to be ON and the remaining solenoid valves are de-energized to be OFF, to supply the apply pressures to a desired set of engaging elements. When seventh solenoid valve SOL7 is OFF, first directional control valve SV1 is displaced rightward in FIG. 2 so that fluid communication is allowed between second pressure regulating valve CV2 and input clutch C1 while low brake B2 is connected to the drain circuit. This is effective for preventing an interlock state failure therebetween. On the other hand, second directional control valve SV2 is displaced leftward in FIG. 2, receiving the D range pressure at fourth port c4. Sixth pressure regulating valve CV6 is displaced upward in FIG. 2. As a result, a regulated hydraulic pressure is supplied to fourth directional control valve SV4. Fourth directional control valve SV4 is displaced rightward, receiving the D range pressure, to allow fluid communication between fluid passages 121 and 123 and to connect fluid passage 122 to the drain circuit. Accordingly, a hydraulic pressure is supplied to direct clutch C2 while no hydraulic pressure is supplied to third directional control valve SV3 via fluid passage 122. Third directional control valve SV3 is displaced rightward, receiving no signal pressure at fourth port d4 from seventh solenoid valve SOL7. Upon this, although fluid communication is allowed between fluid passage 106c (second port d2) and fluid passage 130 (third port d3) in third directional control valve SV3, no hydraulic pressure is supplied to fluid passage 106c from manual valve MV, and thereby no hydraulic pressure is supplied to reverse brake B4.

<Fifth gear> In fifth gear, input clutch C1, direct clutch C2 and H&LR clutch C3 are applied as shown by a set of open circles in FIG. 8.

In fifth gear, with input clutch C1 applied, the rotation of input shaft INPUT is inputted into second connection member M2. On the other hand, with direct clutch C2 and H&LR clutch C3 applied, the rotating elements of third planetary gear G3 rotate as a unit. As a result, the rotational speed of input shaft INPUT is outputted from third planet-pinion carrier PC3 to output shaft OUTPUT without reduction.

In the speed relationship diagram of FIG. 9, fifth gear is defined by the line connecting the engagement points of input clutch C1, direct clutch C2 and H&LR clutch C3 to define that the engine output speed is outputted without change. Thus, the rotation inputted from input shaft INPUT is outputted from output shaft OUTPUT without reduction.

In fifth gear, the torque or power flows through input clutch C1, direct clutch C2, H&LR clutch C3, first connection member M1, second connection member M2, and third connection member M3. Thus, only third planetary gear G3 serves for torque transmission.

As shown in the solenoid valve operation table of FIG. 10, in fifth gear, all the solenoid valves SOL1, SOL2, SOL3, SOL4, SOL5, SOL6 and SOL7 are de-energized to be OFF, to supply the apply pressures to a desired set of engaging elements. When seventh solenoid valve SOL7 is OFF, first directional control valve SV1 is displaced rightward in FIG. 2 so that fluid communication is allowed between second pressure regulating valve CV2 and input clutch C1 while low brake B2 is connected to the drain circuit. This is effective for preventing an interlock state failure therebetween. On the other hand, second directional control valve SV2 is displaced leftward in FIG. 2, receiving the D range pressure at fourth port c4. Sixth pressure regulating valve CV6 is displaced upward in FIG. 2. As a result, a regulated hydraulic pressure is supplied to fourth directional control valve SV4. When seventh solenoid valve SOL7 is OFF, first directional control valve SV1 is displaced rightward in FIG. 2 so that fluid communication is allowed between second pressure regulating valve CV2 and input clutch C1 while low brake B2 is connected to the drain circuit. This is effective for preventing an interlock state failure therebetween. On the other hand, second directional control valve SV2 is displaced leftward in FIG. 2, receiving the D range pressure at fourth port c4. Sixth pressure regulating valve CV6 is displaced upward in FIG. 2. As a result, a regulated hydraulic pressure is supplied to fourth directional control valve SV4. Fourth directional control valve SV4 is displaced rightward, receiving the D range pressure, to allow fluid communication between fluid passages 121 and 123 and to connect fluid passage 122 to the drain circuit. Accordingly, a hydraulic pressure is supplied to direct clutch C2 while no hydraulic pressure is supplied to third directional control valve SV3 via fluid passage 122. Third directional control valve SV3 is displaced rightward, receiving no signal pressure at fourth port d4 from seventh solenoid valve SOL7. Upon this, although fluid communication is allowed between fluid passage 106c (second port d2) and fluid passage 130 (third port d3) in third directional control valve SV3, no hydraulic pressure is supplied to fluid passage 106c from manual valve MV, and thereby no hydraulic pressure is supplied to reverse brake B4.

<Sixth gear> In sixth gear, input clutch C1, H&LR clutch C3 and 2346-brake B3 are applied as shown by a set of open circles in FIG. 8.

In sixth gear, with input clutch C1 applied, the rotation of input shaft INPUT is inputted into second connection member M2 while inputted into second ring gear R2. On the other hand, with 2346-brake B3 applied, the rotation slowed down by second planetary gear G2 is transmitted to fourth ring gear R4 via first connection member M1. Further, with H&LR clutch C3 applied, second planetary gear arrangement GS2 outputs from third planet-pinion carrier PC3 to output shaft OUTPUT a rotation defined by the rotation of fourth ring gear R4 and the rotation of second connection member M2.

In the speed relationship diagram of FIG. 9, sixth gear is defined by the engagement point of 2346-brake B3 to define how the engine output speed is reduced by second planetary gear G2, and the line connecting the engagement point of input clutch C1 to define that the engine output speed is directly inputted into second connection member M2 and the engagement point of H&LR clutch C3 to define how the rotational speed is changed in second planetary gear arrangement GS2. Thus, the rotation inputted from input shaft INPUT is accelerated and outputted from output shaft OUTPUT.

In sixth gear, the torque or power flows through input clutch C1, H&LR clutch C3, 2346-brake B3, first connection member M1, second connection member M2, and third connection member M3. Thus, second planetary gear G2 and second planetary gear arrangement GS2 serve for torque transmission.

As shown in the solenoid valve operation table of FIG. 10, in sixth gear, fifth and sixth solenoid valves SOL5 and SOL6 are energized to be ON, and the remaining solenoid valves SOL, SOL2, SOL3, SOL4 and SOL7 are de-energized to be OFF, to supply the apply pressures to a desired set of engaging elements. When seventh solenoid valve SOL7 is OFF, first directional control valve SV1 is displaced rightward in FIG. 2 so that fluid communication is allowed between second pressure regulating valve CV2 and input clutch C1 while low brake B2 is connected to the drain circuit. This is effective for preventing an interlock state failure therebetween. On the other hand, second directional control valve SV2 is displaced leftward in FIG. 2, receiving the D range pressure at fourth port c4. Upon this, fluid communication is allowed between first port c1 and third port c3 of second directional control valve SV2 so that the D range pressure acts on sixth pressure regulating valve CV6. At this time, sixth pressure regulating valve CV6 is displaced downward in FIG. 2. As a result, the D range pressure is not supplied to direct clutch C2 nor to fourth directional control valve SV4. Fourth directional control valve SV4 is displaced rightward, receiving the D range pressure, to allow fluid communication between fluid passages 121 and 123 and to connect fluid passage 122 to the drain circuit. Accordingly, a hydraulic pressure is supplied to direct clutch C2 while no hydraulic pressure is supplied to third directional control valve SV3 via fluid passage 122. Third directional control valve SV3 is displaced rightward, receiving no signal pressure at fourth port d4 from seventh solenoid valve SOL7. Upon this, although fluid communication is allowed between fluid passage 106c (second port d2) and fluid passage 130 (third port d3) in third directional control valve SV3, no hydraulic pressure is supplied to fluid passage 106c from manual valve MV, and thereby no hydraulic pressure is supplied to reverse brake B4.

<Seventh gear> In seventh gear, input clutch C1, H&LR clutch C3 and front brake B1 (first one-way clutch F1) are applied as shown by a set of open circles in FIG. 8.

In seventh gear, with input clutch C1 applied, the rotation of input shaft INPUT is inputted into second connection member M2 while inputted into second ring gear R2. On the other hand, with front brake B1 applied, the rotation slowed down by first planetary gear arrangement GS1 is transmitted to fourth ring gear R4 via first connection member M1. With H&LR clutch C3 applied, second planetary gear arrangement GS2 outputs from third planet-pinion carrier PC3 to output shaft OUTPUT a rotation defined by the rotation of fourth ring gear R4 and the rotation of second connection member M2.

In the speed relationship diagram of FIG. 9, seventh gear is defined by the engagement point of front brake B1 to define how the engine output speed is reduced by first planetary gear arrangement GS1, and the line connecting the engagement point of input clutch C1 to define that the engine output speed is directly inputted into second connection member M2 and the engagement point of H&LR clutch C3 to define how the rotational speed is changed in second planetary gear arrangement GS2. Thus, the rotation inputted from input shaft INPUT is accelerated and outputted from output shaft OUTPUT.

In seventh gear, the torque or power flows through input clutch C1, H&LR clutch C3, front brake B1, first connection member M1, second connection member M2, and third connection member M3. Thus, first planetary gear arrangement GS1 and second planetary gear arrangement GS2 serve for torque transmission.

As shown in the solenoid valve operation table of FIG. 10, in seventh gear, third and sixth solenoid valves SOL3 and SOL6 are energized to be ON, and the remaining solenoid valves SOL1, SOL2, SOL4, SOL5 and SOL7 are de-energized to be OFF, to supply the apply pressures to a desired set of engaging elements. When seventh solenoid valve SOL7 is OFF, first directional control valve SV1 is displaced rightward in FIG. 2 so that fluid communication is allowed between second pressure regulating valve CV2 and input clutch C1 while low brake B2 is connected to the drain circuit. This is effective for preventing an interlock state failure therebetween. On the other hand, second directional control valve SV2 is displaced leftward in FIG. 2, receiving the D range pressure at fourth port c4. Upon this, fluid communication is allowed between first port c1 and third port c3 of second directional control valve SV2 so that the D range pressure acts on sixth pressure regulating valve CV6. At this time, sixth pressure regulating valve CV6 is displaced downward in FIG. 2. As a result, the D range pressure is not supplied to direct clutch C2 nor to fourth directional control valve SV4. Fourth directional control valve SV4 is displaced rightward, receiving the D range pressure, to allow fluid communication between fluid passages 121 and 123 and to connect fluid passage 122 to the drain circuit. Accordingly, a hydraulic pressure is supplied to direct clutch C2 while no hydraulic pressure is supplied to third directional control valve SV3 via fluid passage 122. Third directional control valve SV3 is displaced rightward, receiving no signal pressure at fourth port d4 from seventh solenoid valve SOL7. Upon this, although fluid communication is allowed between fluid passage 106c (second port d2) and fluid passage 130 (third port d3) in third directional control valve SV3, no hydraulic pressure is supplied to fluid passage 106c from manual valve MV, and thereby no hydraulic pressure is supplied to reverse brake B4.

<Reverse gear> In reverse gear, H&LR clutch C3, front brake B1 and reverse brake B4 are applied as shown by a set of open circles in FIG. 8.

In reverse gear, with front brake B1 applied, the rotation slowed down by first planetary gear arrangement GS1 is transmitted to fourth ring gear R4 via first connection member M1. On the other hand, with H&LR clutch C3 and reverse brake B4 applied, second planetary gear arrangement GS2 outputs from third planet-pinion carrier PC3 to output shaft OUTPUT a rotation defined by the rotation of fourth ring gear R4 and the stationary state of second connection member M2.

In the speed relationship diagram of FIG. 9, reverse gear is defined by the engagement point of front brake B1 to define how the engine output speed is reduced by first planetary gear arrangement GS1, and the line connecting the engagement point of input clutch C1 to define that the engine output speed is directly inputted into second connection member M2 and the engagement point of H&LR clutch C3 to define how the rotational speed is changed in second planetary gear arrangement GS2. Thus, the rotation inputted from input shaft INPUT is reversed and slowed down and outputted from output shaft OUTPUT.

In reverse gear, the torque or power flows through H&LR clutch C3, front brake B1, reverse brake B4, first connection member M1, second connection member M2, and third connection member M3. Thus, first planetary gear arrangement GS1 and second planetary gear arrangement GS2 serve for torque transmission.

As shown in the solenoid valve operation table of FIG. 10, in reverse gear, second, third and sixth solenoid valves SOL2, SOL3 and SOL6 are energized to be ON, and the remaining solenoid valves SOL, SOL4, SOL5 and SOL7 are de-energized to be OFF, to supply the apply pressures to a desired set of engaging elements. Specifically, seventh solenoid valve SOL7 is energized in an initial stage after the R range is selected, and then de-energized after completion of engagement of reverse brake B4. The R range pressure is supplied to reverse brake B4 via third directional control valve SV3. There is no dedicated pressure regulating valve for the R range. In an initial stage of engaging operation, the apply pressure of reverse brake B4 is regulated by sixth pressure regulating valve CV6 which is also used for direct clutch C2. When the R range pressure is selected by manual valve MV, second directional control valve SV2 is displaced rightward in FIG. 2 to supply the R range pressure to sixth pressure regulating valve CV6. On the other hand, fourth directional control valve SV4 is displaced leftward in FIG. 2 to allow fluid communication between fluid passages 121 and 122. Thus, the hydraulic pressure regulated by sixth pressure regulating valve CV6 is supplied to fluid passage 122. When seventh solenoid valve SOL7 is turned ON under the above initial condition, third directional control valve SV3 is displaced leftward in FIG. 2 to allow fluid communication between fluid passages 122 and 130. Thus, the apply pressure of reverse brake B4 is controlled with the hydraulic pressure regulated by sixth pressure regulating valve CV6. When the engaging operation of reverse brake B4 is completed, seventh solenoid valve SOL7 is turned OFF so that third directional control valve SV3 is displaced rightward in FIG. 2 to allow fluid communication between fluid passages 106c and 130, and thereby that the R range pressure is directly supplied to reverse brake B4 to maintain the applied state of reverse brake B4.

In this embodiment, the provision of third directional control valve SV3 and fourth directional control valve SV4 allows to control the apply pressure of two engaging elements with one pressure regulating valve.

<Effects and advantages of the first directional control valve> The following describes effects and advantages produced by first directional control valve SV1 with reference to the foregoing operation. First directional control valve SV1 is provided in order to ensure that low brake B2 and input clutch C1 are not applied at a time. Even if failures occur both in first solenoid valve SOL1 and in second solenoid valve SOL2 to generate the apply pressures at a time, first directional control valve SV1 inhibits one supply path of apply pressure. This prevents an interlock state between low brake B2 and input clutch C1.

As shown in the clutch and brake engagement operation table of FIG. 8 and the solenoid valve operation table of FIG. 10, low brake B2 is applied in first gear, second gear and third gear, and released in fourth gear, fifth gear, sixth gear and seventh gear. On the other hand, input clutch C1 is applied in fifth gear, sixth gear and seventh gear, and released in first gear, second gear, third gear and fourth gear. Accordingly, both low brake B2 and input clutch C1 are released in fourth gear.

If there is no gear in which both low brake B2 and input clutch C1 are released, it is necessary to upshift from one gear in which low brake B2 is applied and input clutch C1 is released to the next gear in which low brake B2 is released and input clutch C1 is applied. In such an upshift, it is necessary to control the release pressure for low brake B2 and the apply pressure for input clutch C1 in parallel. In such a control, it is difficult to find the optimal timing for switching first directional control valve SV1. Further, it is impossible to control an inertia phase in which each of the associated two engaging elements has a torque capacity.

In contrast to the foregoing construction, in the first embodiment, both low brake B2 and input clutch C1 are released in fourth gear. First directional control valve SV1 may be switched by turning OFF seventh solenoid valve SOL7 during driving in fourth gear. This is effective for preventing an interlock state without adversely affecting the shift sequence control.

<Control process against failures> In general, there is a possibility that an automatic transmission is subjected to failures such as interlock-state failures, neutral-state failures, and abnormal gear-ratio failures.

An interlock-state failure is defined as a failure that rotation of input shaft INPUT and rotation of output shaft OUTPUT is simultaneously fixed by an engaging-state failure of an engaging element. When an interlock-state failure occurs while the vehicle is running, the drive wheels are subjected to a rapidly stopping torque. Accordingly, an interlock-state failure can be detected by monitoring a state of the vehicle such as deceleration of the vehicle.

A neutral-state failure is defined as a failure that an engaging element which is applied to receive a rotation from input shaft INPUT in a selected gear is in a significantly slipping state or a failure that a disengaging-state failure interrupts transmission of rotation to output shaft OUTPUT. When a neutral-state failure occurs while the vehicle is running, the ratio of rotation of output shaft OUTPUT to rotation of input shaft INPUT is significantly small. Accordingly, a neutral-state failure can be detected by monitoring an actual transmission gear ratio (input speed/output speed) and detecting that the actual transmission gear ratio is abnormally higher than the normal transmission gear ratio of the selected gear.

An abnormal gear-ratio failure is defined as a failure that the actual transmission gear ratio is deviated from the normal transmission gear ratio of the selected gear by a specific amount or more, which is caused by a slight slipping state of an engaging element which is applied in the selected gear, or by an engaging-state failure or disengaging-state failure of the associated engaging element.

An engaging-state failure is defined as a failure that an engaging element remains applied even though requested to be released, or, in other words, the engaging element cannot be fully released. A disengaging-state failure is defined as a failure that an engaging element remains released even though requested to be applied, or, in other words, the engaging element cannot be fully applied. In this embodiment, failures due to electrical failures such as breaks and short circuits in the solenoids can be detected by monitoring electric current without estimation based on physical phenomenon. Accordingly, such failures are not involved in this embodiment. This embodiment deals with failures due to states where the valves are caught under the influence of contaminations, etc. in the hydraulic circuit, which is called valve stiction. Valve stiction cannot be detected except by logically presuming physical phenomenon actually produced within the automatic transmission.

In this embodiment, the system is configured to detect and identify interlock-state failures, neutral-state failures, and abnormal gear-ratio failures, to carry out a shift into an escape gear, to identify the abnormal part, and to carry out a shift control to supply a driving power. An escape gear is defined as a gear which is established by the control process performed when detecting failures. An escape gear is used not only as a temporary gear from fault detection to vehicle stop, but also as a gear after vehicle restart. The following describes this failure detection process.

FIG. 11 is a flow chart showing an outline of a process of failure detection and failure handling. This process is carried out by ATCU 20 at intervals of a predetermined control cycle.

At Step S1, ATCU 20 performs a process of abnormality detection control. The abnormality detection control process is defined as a process of detecting an abnormality in the automatic transmission and identifying the abnormality as one of an interlock-state failure, an abnormal gear-ratio failure and neutral-state failure. This is described in detail below.

At Step S2, ATCU 20 judges whether or not the abnormality detection control process detected an abnormality in the automatic transmission. When the answer to Step S2 is affirmative (YES), the routine proceeds to Step S3. On the other hand, when the answer to Step S2 is negative (NO), the routine returns to Step S1, repeating the abnormality detection control process.

At Step S3, ATCU 20 performs a process of escape shift control. The escape shift control process is defined as a process of temporarily shifting into an escape gear to maintain the state where the vehicle is running with a driving torque, escaping from the abnormal condition in view of that it is impossible to maintain the state where the vehicle is running with a driving torque in the selected gear and that there is a possibility to adversely affect the safety of the vehicle in the selected gear. This is described in detail below.

At Step S4, ATCU 20 judges whether or not the vehicle is stationary. When the answer to Step S4 is YES, the routine proceeds to Step S5. On the other hand, when the answer to Step S4 is NO, the routine returns to Step S3, repeating the escape shift control process. Thus, ATCU 20 holds the escape gear established by the escape shift control process until the vehicle is brought to be stationary.

At Step S5, ATCU 20 performs a process of abnormality identification control when restarting the vehicle after the vehicle stop. The abnormality identification control process is defined as a process of establishing specific gears in order to identify an abnormal engaging element which causes the abnormality in the automatic transmission. While the escape shift control process is performed at occurrence of the above-mentioned abnormalities, it is possible to identify the abnormal engaging element if there is an adequate period of time. However, for example, when a failure occurs at the time of rapid braking etc., it is possible that the vehicle stops before identifying the abnormal engaging element. Further, when the vehicle is stationary, it is difficult to identify the abnormal engaging element using the actual transmission gear ratio. Accordingly, in this embodiment, the identification of the abnormal engaging element is performed in vehicle restart after the vehicle stop. This is described in detail below.

At Step S6, ATCU 20 performs a process of abnormality handling shift control. The abnormality handling shift control is defined as a process of controlling the automatic transmission in accordance with the identification of the abnormal engaging element, using a set of normal gears, or, if the failure is an engaging-state failure of the abnormal engaging element, using the engagement of the abnormal engaging element. This is described in detail below.

Figure 12:
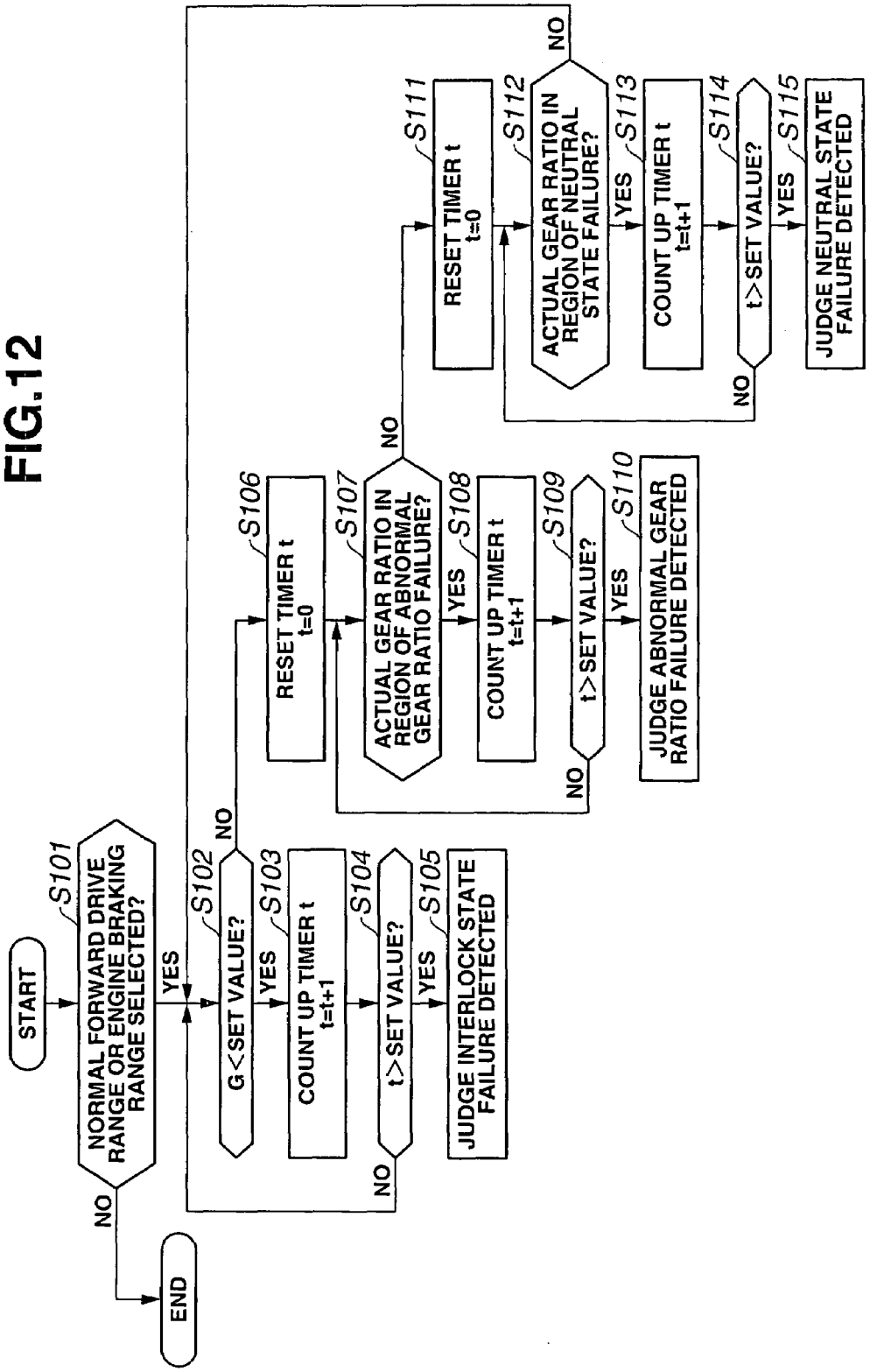
FIG. 12 is a flow chart showing a process of abnormality detection control provided in the first embodiment.

<Abnormality detection control process> The following describes the abnormality detection control process of Step S1 in detail. FIG. 12 is a flow chart showing the abnormality detection control process.

At Step S101, ATCU 20 judges whether or not the automatic transmission is operating in one of the normal forward drive range and the engine braking range. When the answer to Step S101 is YES, the routine proceeds to Step S102. On the other hand, when the answer to Step S101 is NO, the routine returns.

At Step S102, ATCU 20 judges whether or not a foot brake is inoperative (a brake pedal switch is OFF) and vehicle acceleration G defined to be positive in the forward direction and negative in the backward direction is below a predetermined set value. When the answer to Step S102 is YES, the routine proceeds to Step S103. On the other hand, when the answer to Step S102 is NO, the routine proceeds to Step S106. This judgment is based on that the vehicle is rapidly slowed down by a high deceleration when an interlock-state failure occurs.

At Step S103, ATCU 20 counts up a timer t by incrementing timer t by 1.

At Step S104, ATCU 20 judges whether or not the count value of timer t is larger than a predetermined set value. When the answer to Step S104 is YES, the routine proceeds to Step S105. On the other hand, when the answer to Step S104 is NO, the routine returns to Step S102, repeating Steps S102 to S104. When the count value of timer t is larger than the set value, it indicates that the above condition of inter-lock state failure is satisfied continuously over a certain period of time. Accordingly, when the count value of timer t is larger than the set value, it is judged that there is an interlock-state failure. This eliminates a case where the condition of interlock state failure is temporarily fulfilled under the influence of noises etc.

At Step S105, ATCU 20 judges that an interlock-state failure is present in the automatic transmission.

At Step S106, ATCU 20 resets timer t to 0.

Figures 17, 18:
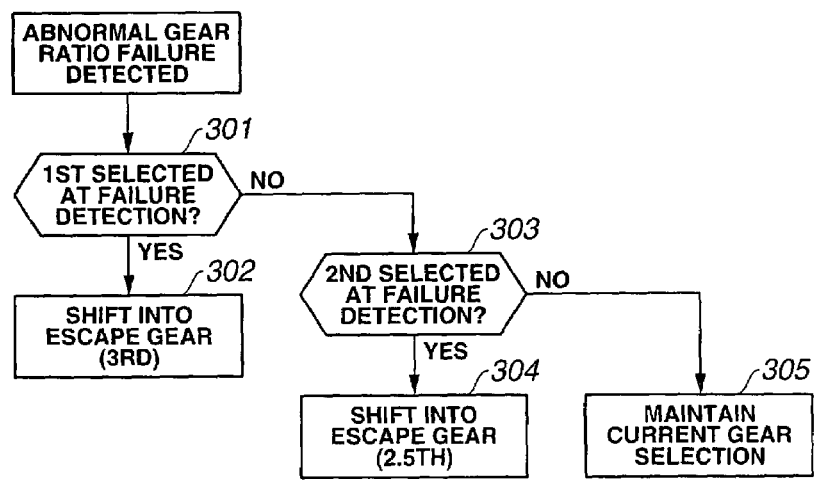
FIG. 17 is a diagram showing in tabular form a set of possible gear ratios established when a failure occurs in each selected gear.
FIG. 18 is a flow chart showing a process of escape shift control provided in the first embodiment, which is carried out when it is judged that an abnormal gear ratio failure is present in the automatic transmission.

At Step S107, ATCU 20 judges whether or not the actual transmission gear ratio is present within a predetermined region of abnormal gear-ratio failure. When the answer to Step S107 is YES, the routine proceeds to Step S108. On the other hand, when the answer to Step S107 is NO, the routine proceeds to Step S111. As shown in FIG. 17, the abnormal gear ratio failure region is defined as a region including a part in which the actual transmission gear ratio is larger than the normal transmission gear ratio of the selected gear and a part in which the actual transmission gear ratio is smaller by about one step than the normal transmission gear ratio of the selected gear. FIG. 17 is a diagram showing in tabular form a set of possible gear ratios established when a failure occurs in each selected gear. In FIG. 17, an open circle represents the normal transmission gear ratio of a selected gear, an open star represents the transmission gear ratio of a possible gear which is established by the engaging-state failure or disengaging-state failure of an engaging element in a selected gear. In FIG. 17, a diagonally shaded region represents a region of neutral-state failure.

At Step S108, ATCU 20 counts up timer t by incrementing timer t by 1.

At Step S109, ATCU 20 judges whether the count value of timer t is larger than a predetermined set value. When the answer to Step S109 is YES, the routine proceeds to Step S110. On the other hand, when the answer to Step S109 is NO, the routine returns to Step S107, repeating Steps S107 to S109.

At Step S110, ATCU 20 judges that an abnormal gear-ratio failure is present in the automatic transmission.

At Step S111, ATCU 20 resets timer t to 0.

At Step S112, ATCU-20 judges whether or not the actual transmission gear ratio is present within a predetermined region of neutral-state failure. When the answer to Step S112 is YES, the routine proceeds to Step S113. On the other hand, when the answer to Step S112 is NO, the routine returns to Step S102. As shown in FIG. 17, the neutral-state failure region is defined as a region in which the actual transmission gear ratio is larger by one step or more than the normal transmission gear ratio of the selected gear, represented by a diagonally shaded region.

At Step S113, ATCU 20 counts up timer t by incrementing timer t by 1.

At Step S114, ATCU 20 judges whether the count value of timer t is larger than a predetermined set value. When the answer to Step S114 is YES, the routine proceeds to Step S115. On the other hand, when the answer to Step S114 is NO, the routine returns to Step S112, repeating Steps S112 to S114.

At Step S115, ATCU 20 judges that a neutral-state failure is present in the automatic transmission.

The foregoing abnormality detection control process serves to detect interlock-state failures, abnormal gear-ratio failures, and neutral-state failures.

Figure 13:
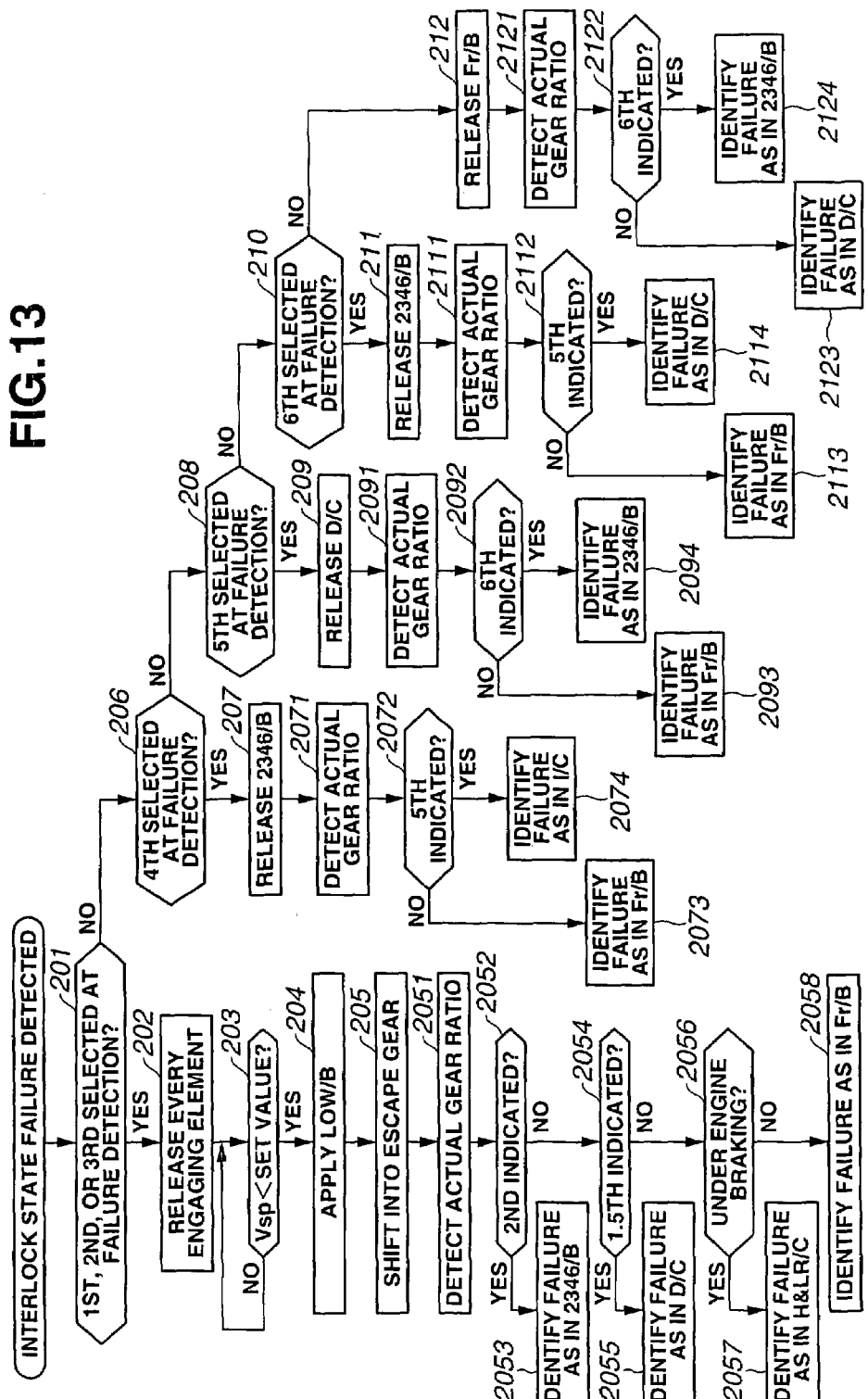
FIG. 13 is a flow chart showing a process of escape shift control provided in the first embodiment, which is carried out when it is judged that an interlock-state failure is present in the automatic transmission.

<Escape shift control process under interlock-state failure> The following describes a process of escape shift control when it is determined that an interlock-state failure is present in the automatic transmission by the foregoing abnormality detection control process. FIG. 13 is a flow chart showing the escape shift control process.

<Escape shift control process in first gear, second gear, and third gear> At Step 201, ATCU 20 judges whether or not the selected gear is either first gear, second gear, or third gear when the interlock-state failure is detected. When the answer to Step 201 is YES, the routine proceeds to Step 202. On the other hand, when the answer to Step 201 is NO, the routine proceeds to Step 206.

At Step 202, ATCU 20 releases all the engaging elements.

At Step 203, ATCU 20 judges whether or not vehicle speed Vsp is below a predetermined set value. When the answer to Step 203 is YES, the routine proceeds to Step 204. On the other hand, when the answer to Step 203 is NO, the routine returns to Step 203, repeating Step 203.

At Step 204, ATCU 20 applies low brake B2.

At Step 205, ATCU 20 shifts into an escape gear.

<Process of identifying incorrectly applied engaging element> At Step 2051, ATCU 20 detects the actual transmission gear ratio.

At Step 2052, ATCU 20 judges whether or not the actual transmission gear ratio is identical to the normal transmission gear ratio of second gear. When the answer to Step 2052 is YES, the routine proceeds to Step 2053. On the other hand, when the answer to Step 2052 is NO, the routine proceeds to Step 2054.

At Step 2053, ATCU 20 judges that an engaging-state failure is present in 2346-brake B3.

At Step 2054, ATCU 20 judges whether or not the actual transmission gear ratio is identical to the normal transmission gear ratio of 1-2 intermediate gear. When the answer to Step 2054 is YES, the routine proceeds to Step 2055. On the other hand, when the answer to Step 2054 is NO, the routine proceeds to Step 2056.

At Step 2055, ATCU 20 judges that an engaging-state failure is present in direct clutch C2.

At Step 2056, ATCU 20 judges whether or not the vehicle is subjected to engine braking. When the answer to Step 2056 is YES, the routine proceeds to Step 2057. On the other hand, when the answer to Step 2056 is NO, the routine proceeds to Step 2058.

At Step 2057, ATCU 20 judges that an engaging-state failure is present in H&LR clutch C3.

At Step 2058, ATCU 20 judges that an engaging-state failure is present in front brake B1.

<Escape shift control process in fourth gear> At Step 206, ATCU 20 judges whether or not the selected gear is fourth gear when the interlock-state failure is detected. When the answer to Step 206 is YES, the routine proceeds to Step 207. On the other hand, when the answer to Step is 206 is NO, the routine proceeds to Step 208.

At Step 207, ATCU 20 releases 2346-brake B3.

<Process of identifying incorrectly applied engaging element> At Step 2071, ATCU 20 detects the actual transmission gear ratio.

At Step 2072, ATCU 20 judges whether or not the actual transmission gear ratio is identical to the normal transmission gear ratio of fifth gear. When the answer to Step 2072 is YES, the routine proceeds to Step 2074. On the other hand, when the answer to Step 2072 is NO, the routine proceeds to Step 2073.

At Step 2073, ATCU 20 judges that an engaging-state failure is present in front brake B1.

At Step 2074, ATCU 20 judges that an engaging-state failure is present in input clutch C1.

<Escape shift control process in fifth gear> At Step 208, ATCU 20 judges whether or not the selected gear is fifth gear when the interlock-state failure is detected. When the answer to Step 208 is YES, the routine proceeds to Step 209. On the other hand, when the answer to Step 208 is NO, the routine proceeds to Step 210.

At Step 209, ATCU 20 releases direct clutch C2.

<Process of identifying incorrectly applied engaging element> At Step 2091, ATCU 20 detects the actual transmission gear ratio.

At Step 2092, ATCU 20 judges whether or not the actual transmission gear ratio is identical to the normal transmission gear ratio of sixth gear. When the answer to Step 2092 is YES, the routine proceeds to Step 2094. On the other hand, when the answer to Step 2092 is NO, the routine proceeds to Step 2093.

At Step 2093, ATCU 20 judges that an engaging-state failure is present in front brake B1.

At Step 2094, ATCU 20 judges that an engaging-state failure is present in 2346-brake B3.

<Escape shift control process in sixth gear> At Step 210, ATCU 20 judges whether or not the selected gear is sixth gear when the interlock-state failure is detected. When the answer to Step 210 is YES, the routine proceeds to Step 211. On the other hand, when the answer to Step 210 is NO, the routine proceeds to Step 212.

At Step 211, ATCU 20 releases 2346-brake B3.

<Process of identifying incorrectly applied engaging element> At Step 2111, ATCU 20 detects the actual transmission gear ratio.

At Step 2112, ATCU 20 judges whether or not the actual transmission gear ratio is identical to the normal transmission gear ratio of fifth gear. When the answer to Step 2112 is YES, the routine proceeds to Step 2114. On the other hand, when the answer to Step 2112 is NO, the routine proceeds to Step 2113.

At Step 2113, ATCU 20 judges that an engaging-state failure is present in front brake B1.

At Step 2114, ATCU 20 judges that an engaging-state failure is present in direct clutch C2.

<Escape shift control process in seventh gear> At Step 212, ATCU 20 judges that the selected gear is seventh gear when the interlock-state failure is detected, and releases front brake B1.

<Process of identifying incorrectly applied engaging element> At Step 2121, ATCU 20 detects the actual transmission gear ratio.

At Step 2122, ATCU 20 judges whether or not the actual transmission gear ratio is identical to the normal transmission gear ratio of sixth gear. When the answer to Step 2122 is YES, the routine proceeds to Step 2124. On the other hand, when the answer to Step 2122 is NO, the routine proceeds to Step 2123.

At Step 2123, ATCU 20 judges that an engaging-state failure is present in direct clutch C2.

At Step 2124, ATCU 20 judges that an engaging-state failure is present in 2346-brake B3.

The following describes effects and advantages produced by the escape shift control process. When four of the engaging elements are applied at a time in the automatic transmission, the automatic transmission is brought to be in an interlock state. If an interlock state is caused by an engaging-state failure of one engaging element, the interlock state is caused by engagement of three normal engaging elements and the engaging-state failure of one engaging element. Accordingly, it is possible to escape from the interlock state and provide a driving torque by releasing one of the three normal engaging elements. This logic is used to build the escape shift control process. In this embodiment, an escape gear is defined as a gear which after detection of an interlock-state failure, is established in order to escape from the interlock-state failure and to ensure an ability to drive the vehicle.

In first gear, second gear, and third gear, the fluid passage connected to input clutch C1 is mechanically closed by first directional control valve SV1. Accordingly, in first gear, second gear, and third gear, input clutch C1 is excluded from a group of possible incorrectly applied engaging elements. Similarly, in first gear, second gear, and third gear, the fluid passage connected to reverse brake B4 is mechanically closed by fourth directional control valve SV4. Accordingly, in first gear, second gear, and third gear, reverse brake B4 is excluded from a group of possible incorrectly applied engaging elements.

<(i) Interlock-state failures when the selected gear is first gear, second gear, or third gear> In first gear, second gear, and third gear, interlock states are caused by the engaging-state failure of H&LR clutch C3, the engaging-state failure of front brake B1, the engaging-state failure of 2346-brake B3, or the engaging-state failure of direct clutch C2. Under such an interlock state failure, an escape gear can be established by releasing all the engaging elements except low brake B2, i.e. by engagement of low brake B2 and engagement of the incorrectly applied engaging element.

Low brake B2 is applied in each of first gear, second gear, and third gear. When an engaging-state failure occurs in a certain engaging element, the operation of maintaining engagement of low brake B2 and releasing the other engaging elements establishes one of first gear, 1-2 intermediate gear, and second gear. 1-2 intermediate gear is defined as a gear which is established by engagement of first one-way clutch F1, direct clutch C2, and low brake B2 as shown in the speed relationship diagram of FIG. 19.

FIG. 14 is a diagram showing in tabular form a relationship among each selected gear, each possible incorrectly applied engaging element, a released engaging element corresponding to the selected gear, and a gear ratio established under such a condition. As shown in FIG. 14, engagement of incorrectly applied 2346-brake B3 and engagement of low brake B2 establishes normal drive range second gear. Engagement of incorrectly applied direct clutch C2 and engagement of low brake B2 establishes engine braking range 1-2 intermediate gear. Engagement of incorrectly applied front brake B1 and engagement of low brake B2 establishes normal drive range first gear.

In recent years, in multiple-speed transmissions, the transmission gear ratio of first gear and second gear are set to relatively high values in order to provide a wide set of transmission gear ratios in consideration of fuel economy. Interstage ratios of lower gear ratios are also set to higher values than those of higher gear ratios. For this reason, if an escape process is designed so that at occurrence of an interlock-state failure a current higher gear is shifted into first gear or second gear, it is possible that there occurs an extremely large engine braking force, even if the current gear is third gear. When the vehicle speed is high, it is possible that the vehicle is subjected to a deceleration comparable with the case of interlock states.

Also in this embodiment, if all the normal engaging elements are released except low brake B2 applied, it is possible that there occurs a wide range of downshift so that the vehicle is subjected to a large engine braking force depending on which is the incorrectly applied engaging element. Accordingly, in this embodiment, the escape shift control process is configured to output releasing commands to all the engaging elements including low brake B2 when vehicle speed Vsp is above a predetermined set speed value V1 such that there is a possibility that the vehicle is subjected to a rapid engine braking, and then to apply low brake B2 after vehicle speed Vsp decreases below set speed value V1, in order to provide a driving torque without generating a rapid engine braking.

In the above process of this embodiment, when the actual transmission gear ratio is detected after application of low brake B2, the actual transmission gear ratio is one of first gear, 1-2 intermediate gear, and second gear as shown in FIG. 14. Thus, it is possible to identify the abnormal engaging element by detecting the actual transmission gear ratio, and determining which gear is corresponding to the actual transmission gear ratio. Further, in order to identify the abnormal engaging element as front brake B1 or H&LR clutch C3, the escape shift control process is configured to detect whether or not the vehicle is subjected to engine braking. It is possible to determine whether or not the vehicle is subjected to engine braking, in accordance with changes in the engine speed under OFF state of the accelerator pedal.

<(ii) Interlock-state failures when the selected gear is fourth gear> In fourth gear, interlock states are caused by the engaging-state failure of input clutch C1 or the engaging-state failure of front brake B1. Under such an interlock state, an escape gear can be established by releasing 2346-brake B3 among the tree normal engaging elements, i.e. by engagement of direct clutch C2, engagement of H&LR clutch C3 and engagement of the incorrectly applied engaging element. This escape gear is higher than second gear, so that the shift into the escape gears causes no wide range of downshift. Specifically, when an engaging-state failure is present in input clutch C1, fifth gear is established by releasing 2346-brake B3. On the other hand, when an engaging-state failure is present in front brake B1, 2-3 intermediate gear is established by releasing 2346-brake B3. 2-3 intermediate gear is defined as a gear which is established by engagement of front brake B1 (or first one-way clutch F1), engagement of direct clutch C2, and engagement of H&LR clutch C3 as shown in the speed relationship diagram of FIG. 20.

If the actual transmission gear ratio is detected after release of 2346-brake B3, the actual transmission gear ratio is identical to the normal transmission gear ratio of fifth gear or 2-3 intermediate gear as shown in FIG. 14. Thus, it is possible to identify the abnormal engaging element by detecting the actual transmission gear ratio, and determining which gear is corresponding to the actual transmission gear ratio.

<(iii) Interlock-state failures when the selected gear is fifth gear> In fifth gear, interlock states are caused by the engaging-state failure of 2346-brake B3 or the engaging-state failure of front brake B1. Under such an interlock state, an escape gear can be established by releasing 2346-brake B3 among the tree normal engaging elements, i.e. by engagement of input clutch C1, engagement of H&LR clutch C3 and engagement of the incorrectly applied engaging element. This escape gear is higher than second gear, so that the shift into the escape gears causes no wide range of downshift. Specifically, when an engaging-state failure is present in 2346-brake B3, sixth gear is established by releasing direct clutch C2. On the other hand, when an engaging-state failure is present in front brake B1, seventh gear is established by releasing direct clutch C2.

If the actual transmission gear ratio is detected after release of direct clutch C2, the actual transmission gear ratio is identical to the transmission gear ratio value of sixth gear or seventh gear as shown in FIG. 14. Thus, it is possible to identify the abnormal engaging element by detecting the actual transmission gear ratio, and determining which gear is corresponding to the actual transmission gear ratio.

<(iv) Interlock-state failures when the selected gear is sixth gear> In sixth gear, interlock states are caused by the engaging-state failure of direct clutch C2 or the engaging-state failure of front brake B1. Under such an interlock state, an escape gear can be established by releasing 2346-brake B3 among the tree normal engaging elements, i.e. by engagement of input-clutch C1, engagement of H&LR clutch C3 and engagement of the engaging element having the engaging-state failure. This escape gear is higher than second gear, so that the shift into the escape gears causes no wide range of downshift. Specifically, when an engaging-state failure is present in direct clutch C2, fifth gear is established by releasing 2346-brake B3. On the other hand, when an engaging-state failure is present in front brake B1, seventh gear is established by releasing 2346-brake B3.

If the actual transmission gear ratio is detected after release of 2346-brake B3, the actual transmission gear ratio is identical to the normal transmission gear ratio of fifth gear or seventh gear as shown in FIG. 14. Thus, it is possible to identify the abnormal engaging element by detecting the actual transmission gear ratio, and determining which gear is corresponding to the actual transmission gear ratio.

<(v) Interlock-state failures when the selected gear is seventh gear> In seventh gear, interlock states are caused by the engaging-state failure of 2346-brake B3 or the engaging-state failure of direct clutch C2. Under such an interlock state, an escape gear can be established by releasing front brake B1 among the tree normal engaging elements, i.e. by engagement of input clutch C1, engagement of H&LR clutch C3 and engagement of the engaging element having the engaging-state failure. This escape gear is higher than second gear, so that the shift into the escape gears causes no wide range of downshift. Specifically, when an engaging-state failure is present in 2346-brake B3, sixth gear is established by releasing front brake B1. On the other hand, when an engaging-state failure is present in direct clutch C2, fifth gear is established by releasing front brake B1.

If the actual transmission gear ratio is detected after release of front brake B1, the actual transmission gear ratio is identical to the normal transmission gear ratio of fifth gear or sixth gear as shown in FIG. 14. Thus, it is possible to identify the abnormal engaging element by detecting the actual transmission gear ratio, and determining which gear is corresponding to the actual transmission gear ratio.

As described in the foregoing (i)-(v), the escape shift control process is configured to output releasing commands to all the engaging elements including low brake B2 and then to apply low brake B2 after vehicle speed Vsp decreases below set speed value V1, in order to establish an escape gear, in consideration that it is impossible to always establish an escape gear higher than second gear in case an interlock-state failure is detected when the selected gear is first gear, second gear, or third gear. The escape shift control process is also configured to establish an escape gear higher than second gear by releasing one of the engaging elements needed to establish the selected gear, in case a failure is detected when the selected gear is fourth gear, fifth gear, sixth gear or seventh gear. This process is enabled by that the provision of first directional control valve SV1 mechanically inhibits that low brake B2 and input clutch C1 are both applied at a time.

Under normal operating conditions, low brake B2 is applied only in first gear, second gear, and third gear, while input clutch C1 is applied only in fifth gear, sixth gear, and seventh gear. If there is a possibility that an engaging-state failure is present in low brake B2 when an interlock state occurs in fourth gear, fifth gear, sixth gear, and seventh gear, there is a possibility that releasing one engaging element establishes a lower gear to cause a wide range of downshift. In contrast, in this embodiment, the provision of first directional control valve SV1 eliminates a possibility that an engaging-state failure is present in low brake B2 when an interlock state occurs in fourth gear, fifth gear, sixth gear, and seventh gear. This allows to establish an escape gear higher than a reference gear by releasing one engaging element, without causing a wide range of downshift.

Further, the escape shift control process configured to release all the engaging elements, and then apply low brake B2 after vehicle speed Vsp decreases below set speed value V1, is effective for preventing that a rapid braking force is acted on the drive wheels due to engine braking.

Still further, the escape shift control process is configured to operate only one of the engaging elements which is applied in a selected gear in which an interlock-state failure is detected. Although there is a possibility that other escape gears can be obtained by a combination of application/release of a plurality of engaging elements, there is an undesired possibility that such a process shifts into an intermediate gear causing a wide range of downshift and then shifts into an escape gear without causing a wide range of downshift, depending on timings of application/release. In addition, in consideration that an interlock state which causes a rapid deceleration is desired to escape from as soon as possible, and that it is difficult to carry out a complex process of shift control under failed conditions, the escape shift control process configured to establish an escape gear only by releasing one engaging element is effective for enhancing robustness of the escape shift control process.

Still further, it is possible in this embodiment to identify the incorrectly applied engaging element in accordance with the actual transmission gear ratio after application of low brake B2 in first gear, second gear, and third gear, or after release of one of the normal engaging elements needed to be applied in fourth gear, fifth gear, sixth gear, and seventh gear. For example, just after the vehicle is stopped, it is possible to carry out a shift control using gear ratios which can be established by engagement of the incorrectly applied engaging element. This is effective for providing a driving torque and enhancing the driving performance even when an interlock-state failure occurs.

<Escape shift control process under abnormal gear-ratio failure> The following describes a process of escape shift control when it is determined that an abnormal gear-ratio failure is present in the automatic transmission by the abnormality detection control process. Abnormal gear-ratio failures are divided into two cases, i.e. a first case in which the actual transmission gear ratio is deviated from the normal transmission gear ratio of the selected gear due to errors such as a slight slipping state of an engaging element, and a second case in which the actual transmission gear ratio is deviated due to a state caused by the engaging-state failure of an engaging element in which input shaft INPUT is in an interlock state and output shaft OUTPUT is in a neutral state. Each case is described in detail below.

Figure 15:
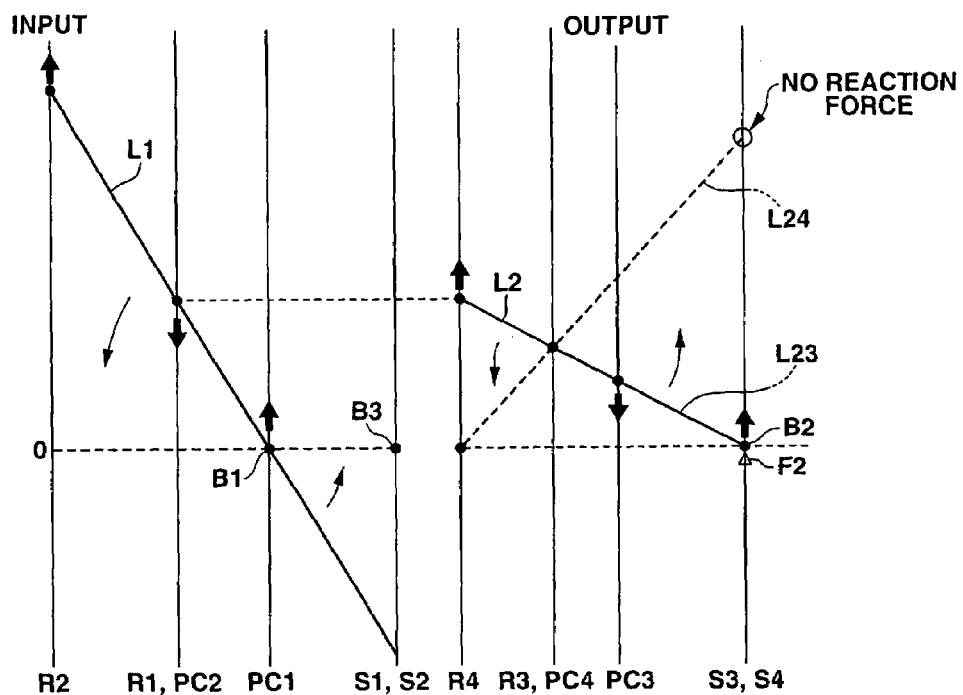
FIG. 15 is a speed relationship diagram of the automatic transmission, in which an engaging-state failure occurs in a 2346-brake provided in the automatic transmission to change the state of speed relationship of the automatic transmission in first gear.

<Input shaft in interlock state, and output shaft in neutral state> The following describes a case in which input shaft INPUT is in an interlock state and output shaft OUTPUT is in a neutral state. FIG. 15 is a speed relationship diagram of the automatic transmission, in which an engaging-state failure occurs in 2346-brake B3 to change the state of speed relationship in engine braking range first gear.

In FIG. 15, rigid levers L1, L2, L23 and L24 represent first planetary gear arrangement GS1, second planetary gear arrangement GS2, third planetary gear G3, and fourth planetary gear G4, respectively. In the speed relationship diagram, each rigid lever indicates the ratio of rotational speed of rotating elements of an associated one of the planetary gears, and also indicates input/output of torque therebetween. In FIG. 15, bold arrows indicate the direction of input/output torques. In FIG. 15, a set of solid lines indicates a normal operating condition, while a set of broken lines indicates an abnormal condition.

When the engine braking range is selected, front brake B1 is applied, H&LR clutch C3 is applied, and low brake B2 is applied in first gear. When input shaft INPUT is subjected to a torque in the upward direction of FIG. 15, front brake B1 is subjected to an upward torque while first ring gear R1 and second planet-pinion carrier PC2 are subjected to downward torques. The downward torque outputted from first planetary gear arrangement GS1 is inputted into fourth ring gear R4 of second planetary gear arrangement GS2 as an upward torque. In second planetary gear arrangement GS2, low brake B2 is subjected to an upward torque while a downward torque is outputted from output shaft OUTPUT.

When an engaging-state failure occurs in 2346-brake B3 under this condition, rigid lever L1 is subjected to a set of forces in such a manner to raise the rotational speed of first sun gear S1 and second sun gear S2 to a stationary state. With front brake B1 applied, rigid lever L1 rotates about the engagement point of front brake B1, so that the rotational speed of all the rotating elements of first planetary gear arrangement GS1 change toward a stationary state (input shaft INPUT is in an interlock state).

Upon this, the rotational speed of fourth ring gear R4 of second planetary gear arrangement GS2, which is connected to first planetary gear arrangement GS1 via first connection member M1, changes toward a stationary state. Since fourth planetary gear G4 is connected only via second one-way clutch F2 to third sun gear S3 connected to low brake B2, rigid lever L24 rotates about the point indicative of fourth planet-pinion carrier PC4.

On the other hand, although the rotational state of third planetary gear G3 of second planetary gear arrangement GS2 is defined by the rotation of low brake B2 and the rotation of output shaft OUTPUT, third planetary gear G3 is subjected to no reaction force from fourth planet-pinion carrier PC4 of fourth planetary gear G4 into third ring gear R3, and thereby is brought to be in a neutral state (output shaft OUTPUT is in a neutral state).

Under the above condition, the engine speed does not increase directly in response to depression of the accelerator pedal under the influence of the interlock state of input shaft INPUT while the vehicle speed (the rotational speed of output shaft OUTPUT) dose not rapidly decrease as in the case of usual interlock states, thus resulting in a coasting drive.

Figure 16:
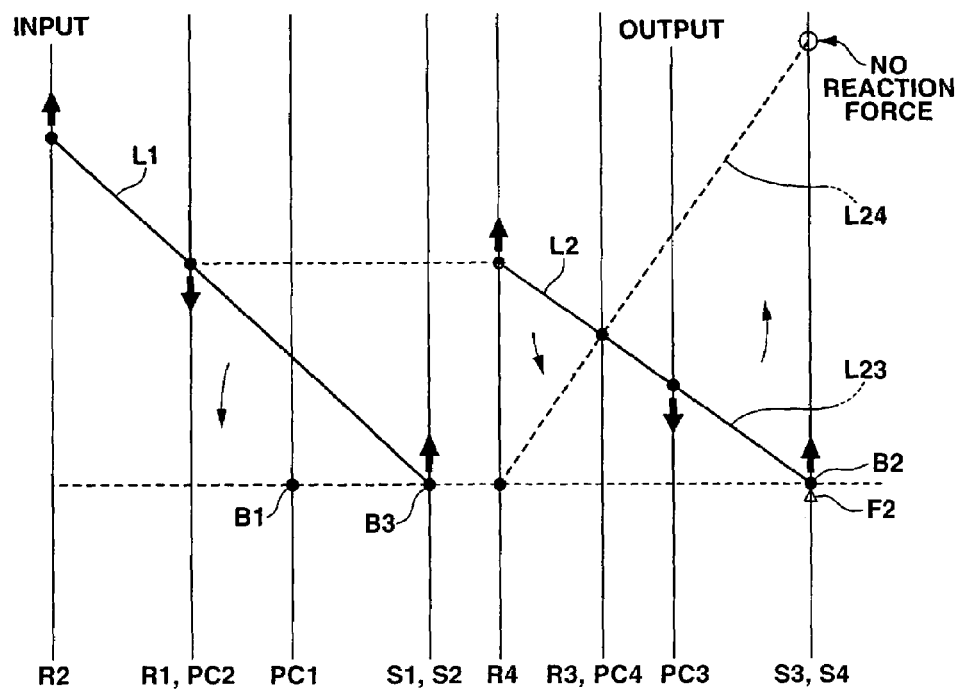
FIG. 16 is a speed relationship diagram of the automatic transmission, in which an engaging-state failure occurs in a front brake provided in the automatic transmission to change the state of speed relationship of the automatic transmission in second gear.

FIG. 16 is a speed relationship diagram of the automatic transmission, in which an engaging-state failure occurs in front brake B1 to change the state of speed relationship in second gear.

In second gear, 2346-brake B3 is applied, H&LR clutch C3 is applied, and low brake B2 is applied under normal operating conditions. When input shaft INPUT is subjected to a torque in the upward direction of FIG. 16, 2346-brake B3 is subjected to an upward torque while first ring gear R1 and second planet-pinion carrier PC2 are subjected to downward torques. The downward torque outputted from first planetary gear arrangement GS1 is inputted into fourth ring gear R4 of second planetary gear arrangement GS2 as an upward torque. In second planetary gear arrangement GS2, low brake B2 is subjected to an upward torque while a downward torque is outputted from output shaft OUTPUT.

When an engaging-state failure occurs in front brake B1 under this condition, rigid lever L1 is subjected to a set of forces in such a manner to reduce the rotational speed of first planet-pinion carrier PC1 to a stationary state. With 2346-brake B3 applied, rigid lever L1 rotates about the engagement point of 2346-brake B3, so that the rotational speed of all the rotating elements of first planetary gear arrangement GS1 change toward a stationary state (input shaft INPUT is in an interlock state).

Upon this, the rotational speed of fourth ring gear R4 of second planetary gear arrangement GS2, which is connected to first planetary gear arrangement GS1 via first connection member M1, changes toward a stationary state. Since fourth planetary gear G4 is connected only via second one-way clutch F2 to third sun gear S3 connected to low brake B2, rigid lever L24 rotates about the point indicative of fourth planet-pinion carrier PC4.

On the other hand, although the rotational state of third planetary gear G3 of second planetary gear arrangement GS2 is defined by the rotation of low brake B2 and the rotation of output shaft OUTPUT, third planetary gear G3 is subjected to no reaction force from fourth planet-pinion carrier PC4 of fourth planetary gear G4 into third ring gear R3, and thereby is brought to be in a neutral state (output shaft OUTPUT is in a neutral state).

Under the above condition, the engine speed does not increase directly in response to depression of the accelerator pedal under the influence of the interlock state of input shaft INPUT while the vehicle speed (the rotational speed of output shaft OUTPUT) dose not rapidly decrease as in the case of usual interlock states, thus resulting in a coasting drive.

As mentioned above, the automatic transmission is brought to be in a state where input shaft INPUT is in an is interlock state and output shaft OUTPUT is in a neutral state, in case an engaging-state failure occurs in 2346-brake B3 in engine braking range first gear, or in case an engaging-state failure occurs in front brake B1 in second gear (both in the engine braking range and in the normal drive range). This state cannot be recognized by a related art which judges that an abnormality is present in the automatic transmission when the actual transmission gear ratio becomes higher. In the state where input shaft INPUT is in an interlock state and output shaft OUTPUT is in a neutral state, the actual transmission gear ratio is lower than the normal transmission gear ratio of the selected gear.

If the judgment is only based on deviation of the actual transmission gear ratio, the presence of failures is recognized but the failures are not identified. Accordingly, in consideration of all the possible failures, an abnormality handling process is designed to ensure safety under all the possible failures. As a result, only a limited set of gear ratios is available under failed conditions, adversely affecting the driving performance.

If hydraulic switches are provided to detect whether hydraulic pressures are supplied to engaging elements in the hydraulic circuit and to detect the above failures, the provision of the hydraulic switches results in complexity in the layout of the hydraulic circuit, increase in the size of the valves, and increase in the number of parts.

In the first embodiment, the provision of first directional control valve SV1 mechanically eliminates a state where low brake B2 and input clutch C1 are both applied at a time. The following description is based on this fact.

When an engaging-state failure or a disengaging-state failure occurs in an engaging element in a selected gear to establish another gear, it is not a case where a neutral state failure is caused by a slipping state of an engaging element. Accordingly, in FIG. 17, neutral-state failures are indicated by a diagonally shaded region for each selected gear in which the actual transmission gear ratio can be established only by a slipping state of an engaging element. In this embodiment, in sixth gear and seventh gear, no gear is established by engaging-state failures or disengaging-state failures. Accordingly, the region of neutral-state failure is defined as a region where the actual transmission gear ratio is higher than the normal transmission gear ratio of the gear lower by one step than the selected gear. The region of abnormal gear-ratio failure is defined as a region where the actual transmission gear ratio is not identical to the normal transmission gear ratio of the selected gear, excluding the region of neutral-state failure.

When the actual transmission gear ratio is within the diagonally shaded region, it is possible to identify that there occurs a neutral-state failure. In contrast, when the actual transmission gear ratio is within the region of abnormal gear-ratio failure and is higher than the normal transmission gear ratio of the selected gear, there is two possibilities, i.e. a first possibility that the automatic transmission can provide a driving torque, and a second possibility that the automatic transmission cannot provide a driving torque. In the state where input shaft INPUT is in an interlock state and output shaft OUTPUT is in a neutral state, the actual transmission gear ratio is lower than normal, resulting in that it is not determined that a neutral-state failure is present in the automatic transmission.

Accordingly, the escape shift control process is configured to identify the failure as one of an interlock-state failure, a neutral-state failure, and an abnormal gear-ratio failure, and to shift into an escape gear escaping from the failure reliably when the selected gear is first gear or second gear.

<Shift control in case of judgment of the presence of an abnormal gear-ratio failure> The following describes a process of shift control performed when the foregoing identifying process judges that an abnormal gear-ratio failure is present in the automatic transmission. FIG. 18 is a flow-chart showing a process of escape shift control provided in the first embodiment, which is carried out when it is judged that an abnormal gear ratio failure is present in the automatic transmission.

At Step 301, ATCU 20 judges whether or not engine braking range first gear is selected when the abnormal gear-ratio failure is detected. When the answer to Step 301 is YES, the routine proceeds to Step 302. When the answer to Step 301 is NO, the routine proceeds to Step 303.

At Step 302, ATCU 20 selects third gear as an escape gear and outputs shifting commands accordingly.

At Step 303, ATCU 20 judges whether or not second gear is selected when the abnormal gear-ratio failure is detected. When the answer to Step 303 is YES, the routine proceeds to Step 304. When the answer to Step 303 is NO, the routine proceeds to Step 305.

At Step 304, ATCU 20 selects 2-3 intermediate gear as an escape gear and outputs shifting commands accordingly.

At Step 305, ATCU 20 holds the current selected gear and inhibits shift operation until vehicle stop. When an abnormal gear-ratio failure is detected in the gears other than first gear and second gear, this failure is not the type where input shaft INPUT is in an interlock state and output shaft OUTPUT is in a neutral state. Accordingly, the automatic transmission can output a driving torque in those gears. Accordingly, the inhibition of shift operation secures an ability to drive the vehicle.

The following describes effects and advantages of the above control process. When the routine proceeds through Steps S106 to S110, it is judged that no interlock-state failure is present in the automatic transmission. Also, at Step S107, it is judged that no neutral-state failure is present in the automatic transmission. When the actual transmission gear ratio is present within the region of abnormal gear-ratio failure under this condition, the following two cases are possible.

Figure 19:
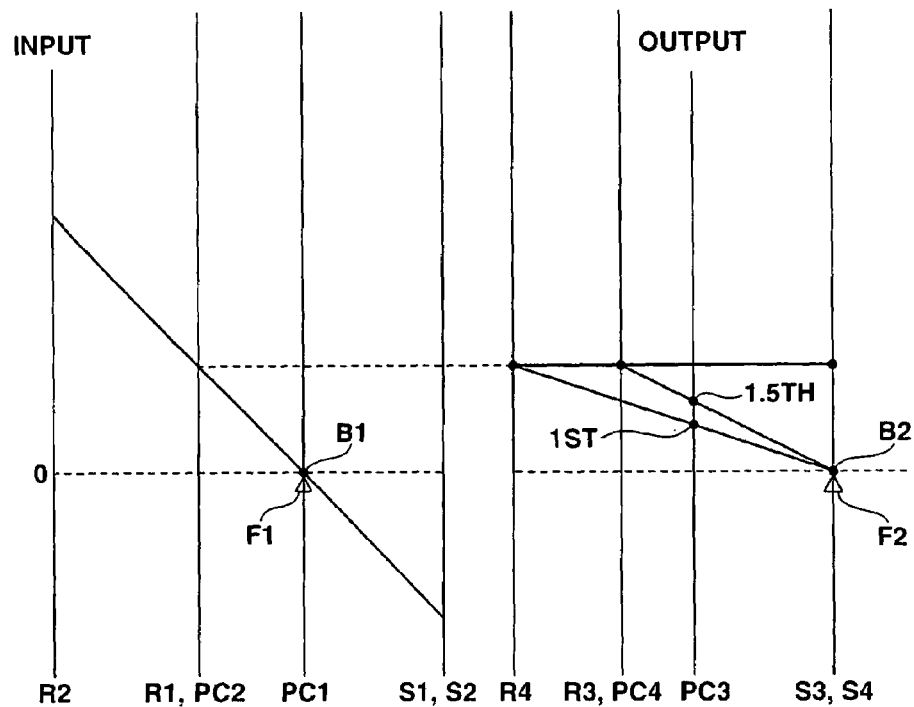
FIG. 19 is a speed relationship diagram of the automatic transmission in 1-2 intermediate gear (1.5th gear) in the first embodiment.

<Example 1> If an engaging-state failure occurs in direct clutch C2 in engine braking range first gear, the rotating elements of fourth planetary gear G4 rotate as a unit to establish 1-2 intermediate gear as shown by bold lines in FIG. 19. As shown in the speed relationship diagram of FIG. 15, if an engaging-state failure occurs in 2346-brake B3, the automatic transmission is brought to be in the state where input shaft INPUT is in an interlock state and output shaft OUTPUT is in a neutral state.

Although in the case of the engaging-state failure of direct clutch C2 1-2 intermediate gear is established to provide a driving torque, no driving torque is provided in the case of the engaging-state failure of 2346-brake B3. As mentioned above, the automatic transmission of this embodiment is equipped with no hydraulic switch, so that it is impossible to identify which engaging element is abnormal incorrectly supplied with a hydraulic pressure. Accordingly, in this embodiment, the escape shift control process is configured in consideration of the possible cases.

The actual transmission gear ratios established by the above two possible failures are within the region of abnormal gear-ratio failure. In the process of FIG. 18, third gear is selected as an escape gear since third gear can be established with the engaging-state failure of one of the two engaging elements, without causing a rapid downshift, in order to provide a driving torque. This is because 2346-brake B3 and direct clutch C2 are both applied in third gear.

Thus, even when an abnormal gear-ratio failure is detected, the shift into third gear as an escape gear is effective for escaping from the failed state where input shaft INPUT is in an interlock state and output shaft OUTPUT is in a neutral state, providing a driving torque, and enhancing the driving performance.

Figure 20:
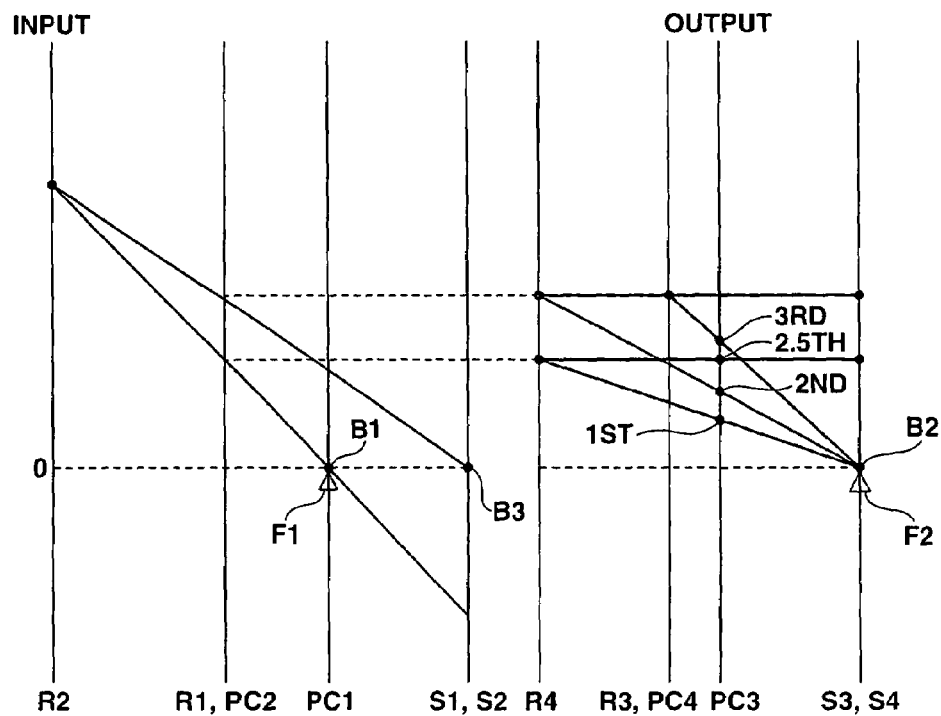
FIG. 20 is a speed relationship diagram of the automatic transmission in 2-3 intermediate gear (2.5th gear) in the first embodiment.

<Example 2> If an engaging-state failure occurs in direct clutch C2 in second gear, the rotating elements of fourth planetary gear G4 rotate as a unit to establish third gear as shown by bold lines in FIG. 20. If a disengaging-state failure occurs in 2346-brake B3, first gear is established as shown by bold lines in FIG. 20. As shown in the speed relationship diagram of FIG. 16, if an engaging-state failure occurs in front brake B1, the automatic transmission is brought to be in the state where input shaft INPUT is in an interlock state and output shaft OUTPUT is in a neutral state.

Although in the case of the engaging-state failure of direct clutch C2 or the disengaging-state failure of 2346-brake B3 third gear or first gear is established to provide a driving torque, a transmission gear ratio close to first gear or third gear is established to provide no driving torque in the case of the engaging-state failure of front brake B1. As described above, the automatic transmission of this embodiment is equipped with no hydraulic switch, so that it is impossible to identify which engaging element is abnormal incorrectly supplied with a hydraulic pressure. Accordingly, in this embodiment, the escape process is configured in consideration of the possible cases.

The actual transmission gear ratios established by the above possible failures are within the region of abnormal gear-ratio failure. In the process of FIG. 18, 2-3 intermediate gear is selected as an escape gear since 2-3 intermediate gear can be established with the failure of one of the engaging elements, without causing a rapid downshift, in order to provide a driving torque. Specifically, as shown by bold lines in FIG. 20, front brake B1, direct clutch C2, and H&LR clutch C3 are applied. This is because direct clutch C2, 2346-brake B3, and H&LR clutch C3 are applied and 2346-brake B3 is released in 2-3 intermediate gear.

Thus, even when an abnormal gear-ratio failure is detected, the shift into 2-3 intermediate gear as an escape gear which is not used under normal operating conditions is effective for escaping from the failed state where input shaft INPUT is in an interlock state and output shaft OUTPUT is in a neutral state, providing a driving torque, and enhancing the driving performance.

Figure 21:
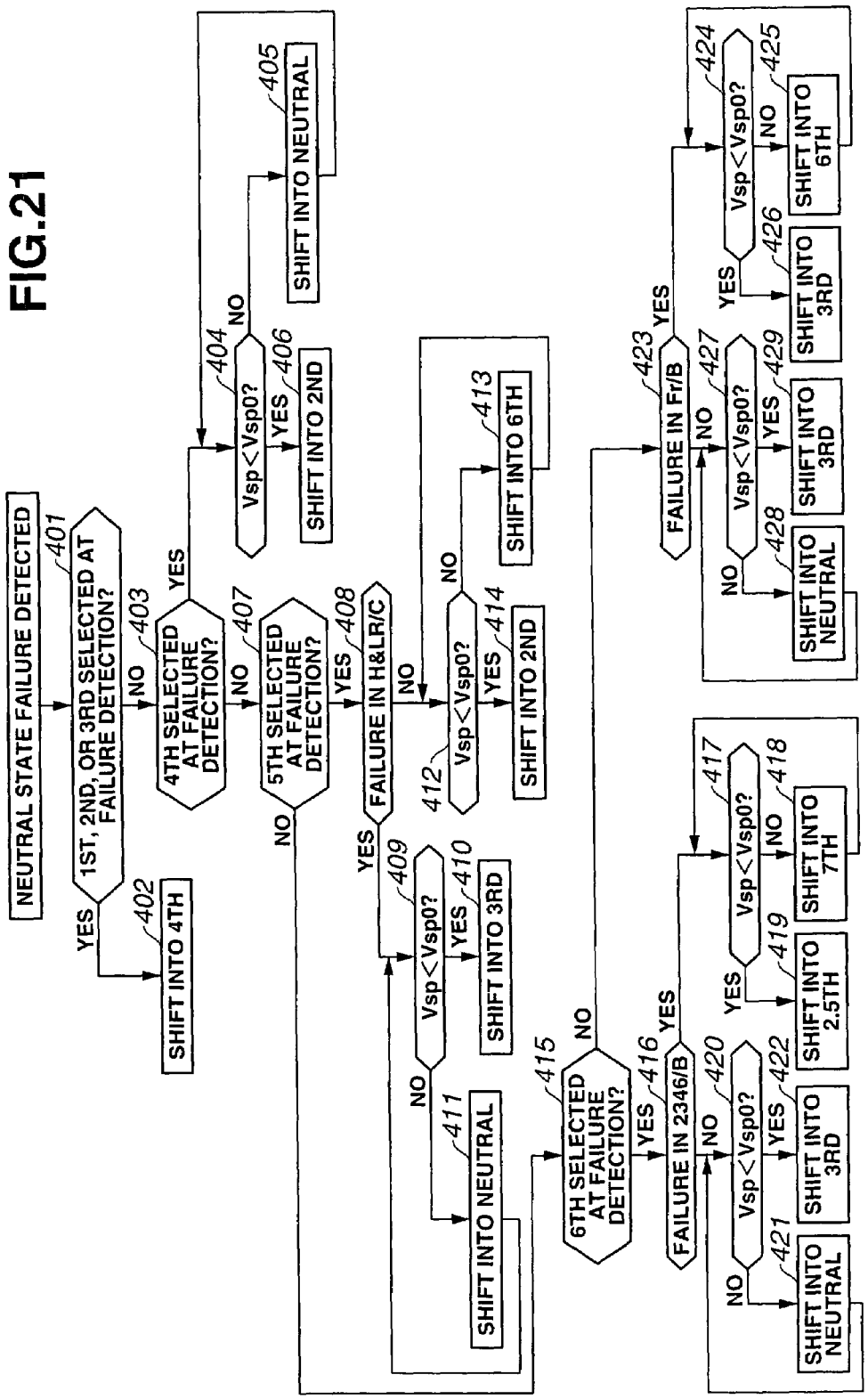
FIG. 21 is a flow chart showing a process of escape shift control provided in the first embodiment, which is carried out when it is judged that a neutral-state failure is present in the automatic transmission.

<Escape shift control process under neutral-state failures> The following describes a process of escape shift control when it is determined that a neutral-state failure is present in the automatic transmission by the foregoing abnormality detection control process. As described with the flow chart of FIG. 12, when the actual transmission gear ratio is within the region of neutral-state failure, it is determined that a neutral-state failure is present in the automatic transmission. FIG. 21 is a flow chart showing the escape shift control process.

<Escape shift control process in first gear, second gear, and third gear> At Step 401, ATCU 20 judges whether or not either first gear, second gear, or third gear is selected when the neural-state failure is detected. When the answer to Step 401 is YES, the routine proceeds to Step 402. On the other hand, when the answer to Step 401 is NO, the routine proceeds to Step 403.

When first gear is selected, first one-way clutch F1 prevents front brake B1 from a slipping state. Even if H&LR clutch C3 is in a slipping state, engagement of low brake B2 prevents the automatic transmission from a neutral state. Therefore, in first gear, a neutral-state failure is caused only by the slipping state of low brake B2.

Next, in case second gear is selected, when the actual transmission gear ratio is higher than the normal transmission gear ratio of first gear as shown by the diagonally-shaded region of FIG. 17, it is judged that a neutral-state failure is present in the automatic transmission. If 2346-brake B3 is in a slipping state, there is no possibility that the actual transmission gear ratio is lower than the normal transmission gear ratio of first gear since first one-way clutch F1 is provided. Therefore, in second gear, a neutral-state failure is caused only by the slipping state of low brake B2.

Next, in case third gear is selected, when the actual transmission gear ratio is higher than the normal transmission gear ratio of 1-2 intermediate gear as shown by the diagonally-shaded region of FIG. 17, it is judged that a neutral-state failure is present in the automatic transmission. If direct clutch C2 is in a slipping state, second gear is established and there is no possibility that the actual transmission gear ratio is lower than the normal transmission gear ratio of 1-2 intermediate gear. On the other hand, if 2346-brake B3 is in a slipping state, 1-2 intermediate gear is established and there is no possibility that the actual transmission gear ratio is lower than the normal transmission gear ratio of 1-2 intermediate gear as shown in FIG. 19. Therefore, in third gear, a neutral-state failure is caused only by the slipping state of low brake B2.

From the above viewpoint, it is possible to identify that low brake B2 is in a slipping state, when detecting a neutral-state failure in first gear, second gear and third gear. Accordingly, under this condition, ATCU 20 uses fourth gear as an escape gear which is the lowest gear that is established without engagement of low brake B2.

<Escape shift control process in fourth gear> At Step 403, ATCU 20 judges whether or not fourth gear is selected when the neural-state failure is detected. When the answer to Step 403 is YES, the routine proceeds to Step 404. On the other hand, when the answer to Step 403 is NO, the routine proceeds to Step 407.

At Step 404, ATCU 20 judges whether or not vehicle speed Vsp is below a predetermined set speed value Vsp0. When the answer to Step 404 is YES, the routine proceeds to Step 406. On the other hand, when the answer to Step 404 is NO, the routine proceeds to Step 405.

At Step 405, ATCU 20 enters a neutral state.

At Step 406, ATCU 20 selects second gear as an escape gear and outputs commands accordingly.

In case fourth gear is selected, when the actual transmission gear ratio is lower than the normal transmission gear ratio of 2-3 intermediate gear as shown by the diagonally-shaded region of FIG. 17, it is judged that a neutral-state failure is present in the automatic transmission. If 2346-brake B3 is in a slipping state, 2-3 intermediate gear is established with first one-way clutch F1 and there is no possibility that the actual transmission gear ratio is lower than the normal transmission gear ratio of 2-3 intermediate gear as shown in FIG. 20. On the other hand, if direct clutch C2 or H&LR clutch C3 is in a slipping state, there is a possibility that the actual transmission gear ratio is lower than the normal transmission gear ratio of 2-3 intermediate gear. Therefore, it is impossible to identify the abnormal engaging element as one of direct clutch C2 and H&LR clutch C3 in fourth gear. Accordingly, in the above process, ATCU 20 enters a neutral state and then uses second gear as an escape gear, in which it is unnecessary to apply direct clutch C2 and H&LR clutch C3, after vehicle speed Vsp decreases to eliminate a possibility that the rotating elements rotate at excessive gear ratios.

<Escape shift control process in fifth gear> At Step 407, ATCU 20 judges whether or not fifth gear is selected when the neural-state failure is detected. When the answer to Step 407 is YES, the routine proceeds to Step 408. On the other hand, when the answer to Step 407 is NO, the routine proceeds to Step 415.

At Step 408, ATCU 20 judges whether or not the failure is in H&LR clutch C3. When the answer to Step 408 is YES, the routine proceeds to Step 409. On the other hand, when the answer to Step 408 is NO, the routine proceeds to Step 412.

At Step 409, ATCU 20 judges whether or not vehicle speed Vsp is below set speed value Vsp0. When the answer to Step 409 is YES, the routine proceeds to Step 410. On the other hand, when the answer to Step 409 is NO, the routine proceeds to Step 411.

At Step 410, ATCU 20 selects third gear as an escape gear and outputs commands accordingly.

At Step 411, ATCU 20 enters a neutral state.

At Step 412, ATCU 20 judges whether or not vehicle speed Vsp is below set speed value Vsp0. When the answer to Step 412 is YES, the routine proceeds to Step 414. On the other hand, when the answer to Step 412 is NO, the routine proceeds to Step 413.

At Step 413, ATCU 20 selects sixth gear as an escape gear and outputs commands accordingly.

At Step 414, ATCU 20 selects second gear as an escape gear and outputs commands accordingly.

Figure 22:
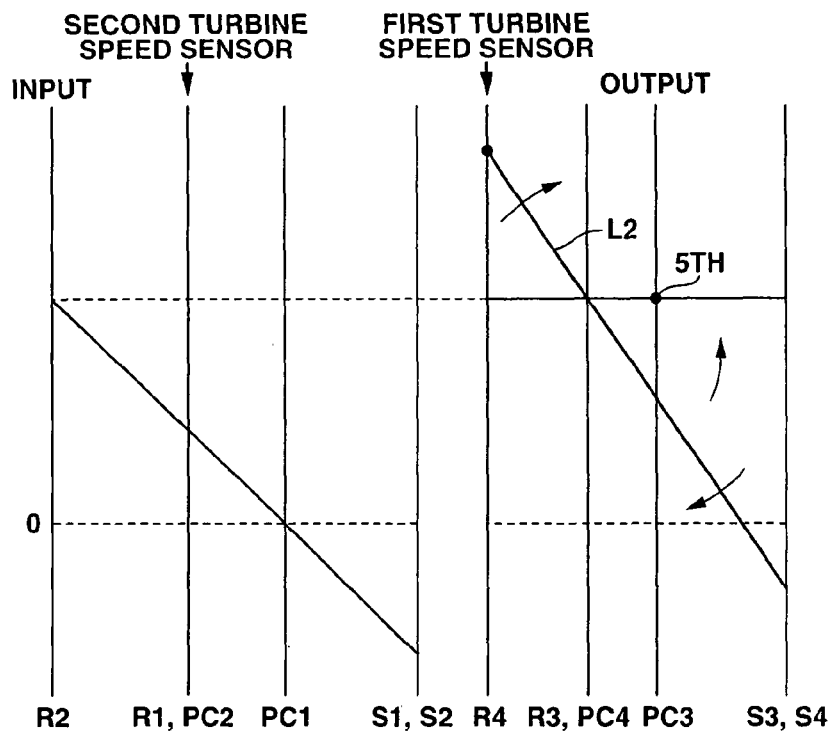
FIG. 22 is a speed relationship diagram of the automatic transmission, in which a neutral-state failure occurs to change the state of speed relationship of the automatic transmission in fifth gear.
Figure 23:
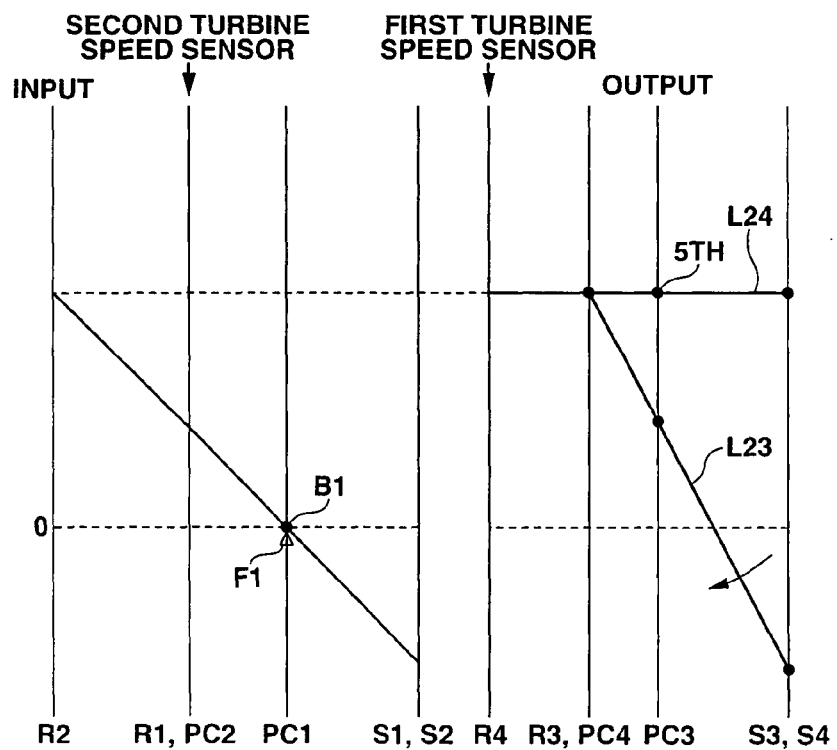
FIG. 23 is another speed relationship diagram of the automatic transmission, in which a neutral-state failure occurs to change the state of speed relationship of the automatic transmission in fifth gear.

In case fifth gear is selected, when the actual transmission gear ratio is lower than the normal transmission gear ratio of 2-3 intermediate gear as shown by the diagonally-shaded region of FIG. 17, it is judged that a neutral-state failure is present in the automatic transmission. If input clutch C1 is in a slipping state, 2-3 intermediate gear is established and there is no possibility that the actual transmission gear ratio is lower than the normal transmission gear ratio of 2-3 intermediate gear as shown in FIG. 20. On the other hand, if direct clutch C2 is in a slipping state, there is a possibility that the actual transmission gear ratio is lower than the normal transmission gear ratio of 2-3 intermediate gear, since lever L2 can rotate about the point indicative of third ring gear R3 or fourth planet-pinion carrier PC4 as shown in FIG. 22. Similarly, if H&LR clutch C3 is in a slipping state, there is a possibility that the actual transmission gear ratio is lower than the normal transmission gear ratio of 2-3 intermediate gear, since lever L23 can rotate about the point indicative of third ring gear R3 or fourth planet-pinion carrier PC4 as shown in FIG. 23. At this time, lever 24 remains in a horizontal position.

As shown in FIGS. 22 and 23, the rotational speed of fourth ring gear R4 changes in different ways in the above two possible cases of neutral-state failures. By checking the difference in detected rotational speed between first turbine speed sensor 3 and second turbine speed sensor 4, it is possible to identify the abnormal engaging element as one of direct clutch C2 and H&LR clutch C3.

In case the failure is present in H&LR clutch C3, it is impossible to escape into other gears. Accordingly, ATCU 20 shifts into third gear, which does not use engagement of H&LR clutch C3, after vehicle speed Vsp decreases below set speed value Vsp0.

In case the failure is present in direct clutch C2, it is possible to shift into sixth gear by applying 2346-brake B3. Accordingly, ATCU 20 first shifts into sixth gear, and then shifts into second gear, which does not use engagement of direct clutch C2, after vehicle speed Vsp decreases below set speed value Vsp0.

<Escape shift control process in sixth gear> At Step 415, ATCU 20 judges whether or not sixth gear is selected when the neural-state failure is detected. When the answer to Step 415 is YES, the routine proceeds to Step 416. On the other hand, when the answer to Step 415 is NO, the routine proceeds to Step 423.

At Step 416, ATCU 20 judges whether or not the failure is in 2346-brake B3. When the answer to Step 416 is YES, the routine proceeds to Step 417. On the other hand, when the answer to Step 416 is NO, the routine proceeds to Step 420.

At Step 417, ATCU 20 judges whether or not vehicle speed Vsp is below set speed value Vsp0. When the answer to Step 417 is YES, the routine proceeds to Step 419. On the other hand, when the answer to Step 417 is NO, the routine proceeds to Step 418.

At Step 418, selects seventh gear as an escape gear and outputs commands accordingly.

At Step 419, selects 2-3 intermediate gear as an escape gear and outputs commands accordingly.

At Step 420, ATCU 20 judges whether or not vehicle speed Vsp is below set speed value Vsp0. When the answer to Step 420 is YES, the routine proceeds to Step 422. On the other hand, when the answer to Step 420 is NO, the routine proceeds to Step 421.

At Step 421, ATCU 20 enters a neutral state.

At Step 422, ATCU 20 selects third gear as an escape gear and outputs commands accordingly.

Figure 24:
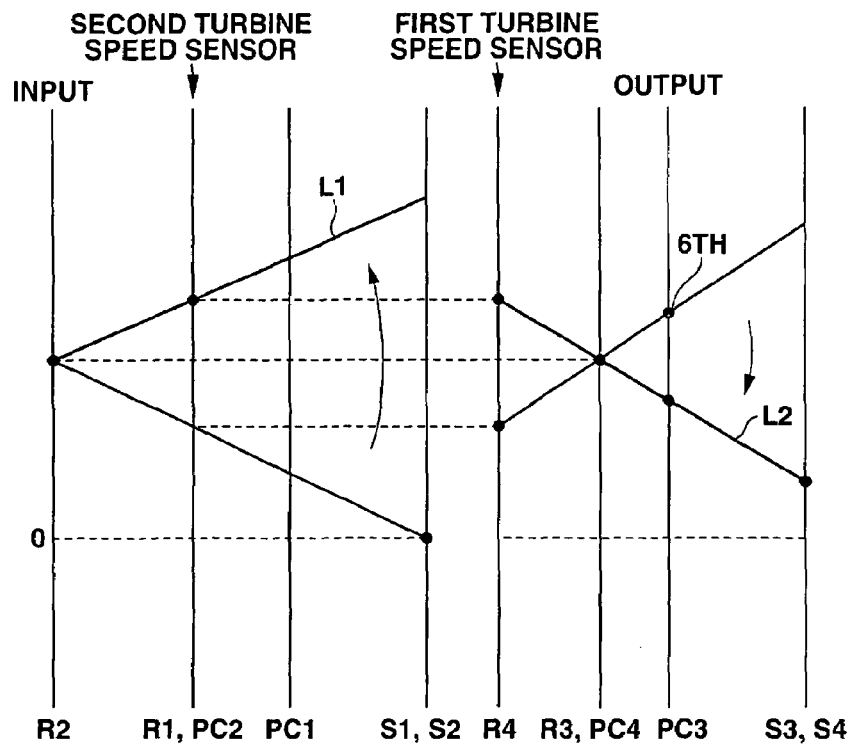
FIG. 24 is a speed relationship diagram of the automatic transmission, in which a neutral-state failure occurs to change the state of speed relationship of the automatic transmission in sixth gear.
Figure 25:
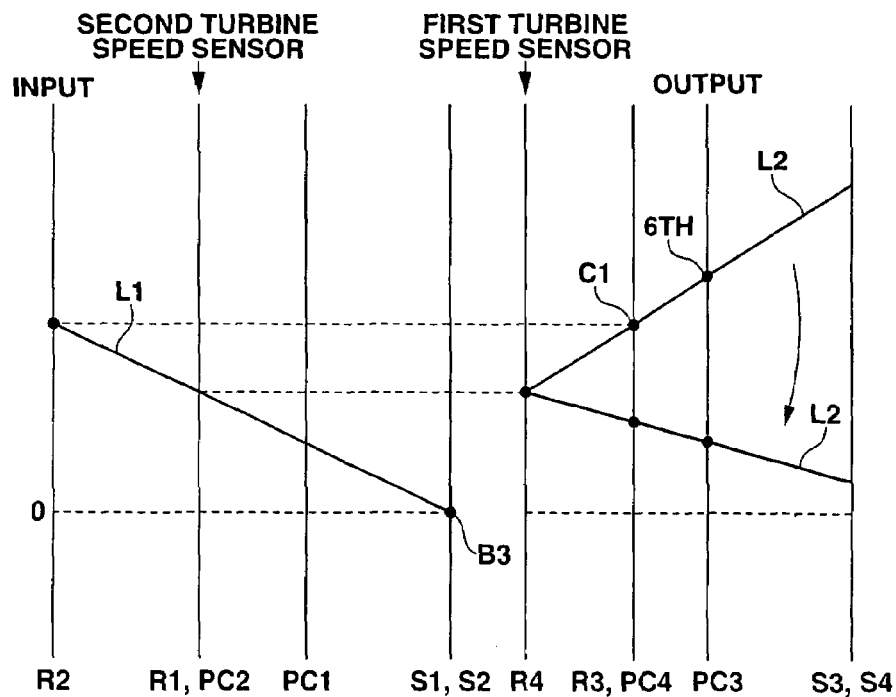
FIG. 25 is another speed relationship diagram of the automatic transmission, in which a neutral-state failure occurs to change the state of speed relationship of the automatic transmission in sixth gear.

In case sixth gear is selected, when the actual transmission gear ratio is lower than the normal transmission gear ratio of fifth gear as shown by the diagonally-shaded region of FIG. 17, it is judged that a neutral-state failure is present in the automatic transmission. If 2346-brake B3 is in a slipping state, there is a possibility that the actual transmission gear ratio is lower than the normal transmission gear ratio of fifth gear, since lever L1 may rotate about the point of input shaft INPUT, and accordingly lever L2 may rotate about the point of third ring gear R3 or fourth planet-pinion carrier PC4 as shown in FIG. 24. Similarly, if input clutch C1 is in a slipping state, there is a possibility that the actual transmission gear ratio is lower than the normal transmission gear ratio of fifth gear, since lever L2 may rotate about the point of fourth ring gear R4 as shown in FIG. 25. Similarly, if H&LR clutch C3 is in a slipping state, there is a possibility that the actual transmission gear ratio is lower than the normal transmission gear ratio of fifth gear, since lever L23 may rotate about the point of third ring gear R3 or fourth ring gear R4 as shown in FIG. 25. At this time, lever 24 remains inclined as in sixth gear.

Figure 26:
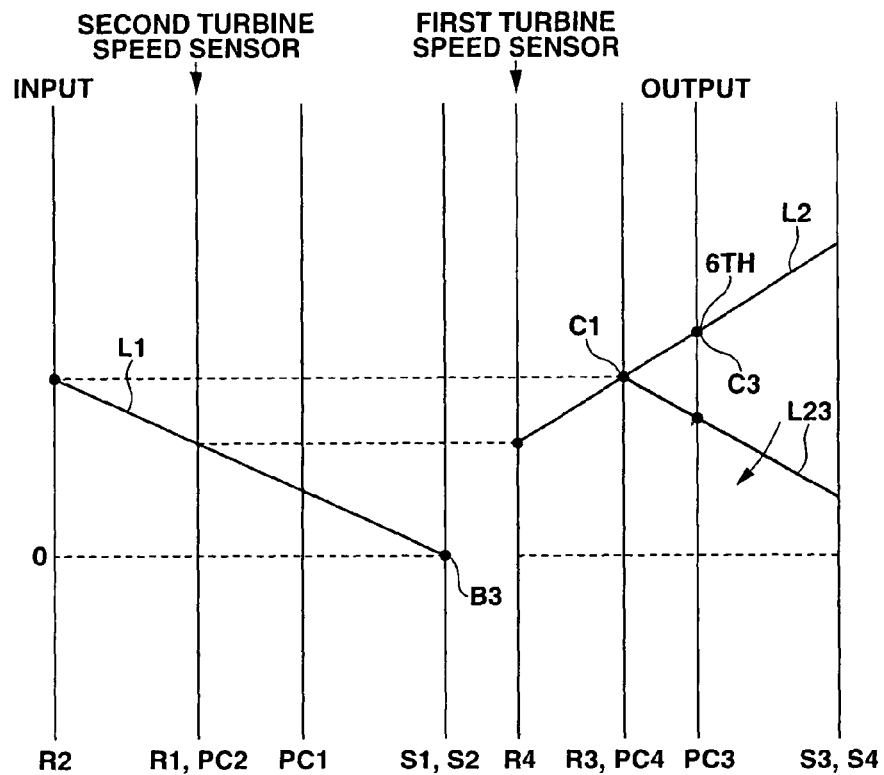
FIG. 26 is another speed relationship diagram of the automatic transmission, in which a neutral-state failure occurs to change the state of speed relationship of the automatic transmission in sixth gear.

As shown in FIGS. 24, 25 and 26, the movement of lever L1 is different in the above three possible cases of neutral-state failures. By checking the difference in detected rotational speed between first turbine speed sensor 3 and second turbine speed sensor 4, it is possible to identify the abnormal engaging element as 2346-brake B3 or the other engaging elements.

In case the failure is present in 2346-brake B3, it is possible to shift into seventh gear by applying front brake B1. Accordingly, ATCU 20 first shifts into seventh gear, and then shifts into 2-3 intermediate gear, which does not use engagement of 2346-brake B3, after vehicle speed Vsp decreases below set speed value Vsp0.

In case the failure is present in the engaging elements other than 2346-brake B3, it is impossible to escape into other gears. Accordingly, ATCU 20 enters a neutral state and then shifts into third gear, which does not use engagement of H&LR clutch C3, after vehicle speed Vsp decreases below set speed value Vsp0.

<Escape shift control process in seventh gear> At Step 423, ATCU 20 judges whether or not the failure is in 2346-brake B3. When the answer to Step 423 is YES, the routine proceeds to Step 424. On the other hand, when the answer to Step 423 is NO, the routine proceeds to Step 427.

At Step 424, ATCU 20 judges whether or not vehicle speed Vsp is below set speed value Vsp0. When the answer to Step 424 is YES, the routine proceeds to Step 426. On the other hand, when the answer to Step 424 is NO, the routine proceeds to Step 425.

At Step 425, ATCU 20 selects sixth gear as an escape gear and outputs commands accordingly.

At Step 426, ATCU 20 selects third gear as an escape gear and outputs commands accordingly.

At Step 427, ATCU 20 judges whether or not vehicle speed Vsp is below set speed value Vsp0. When the answer to Step 427 is YES, the routine proceeds to Step 429. On the other hand, when the answer to Step 427 is NO, the routine proceeds to Step 428.

At Step 428, ATCU 20 enters a neutral state.

At Step 429, ATCU 20 selects third gear as an escape gear and outputs commands accordingly.

Figure 27:
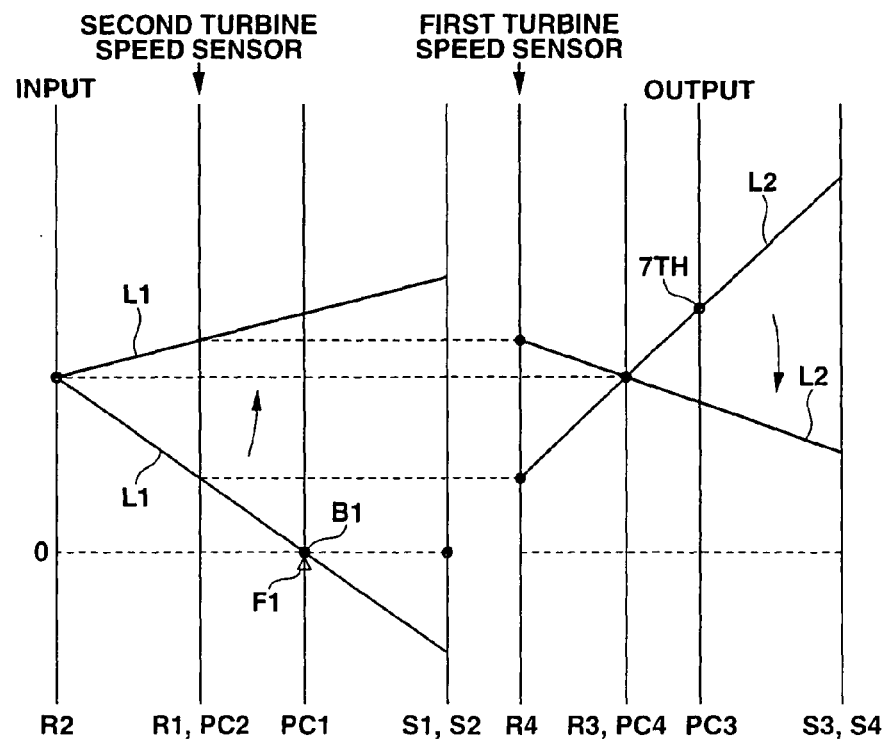
FIG. 27 is a speed relationship diagram of the automatic transmission, in which a neutral-state failure occurs to change the state of speed relationship of the automatic transmission in seventh gear.
Figure 28:
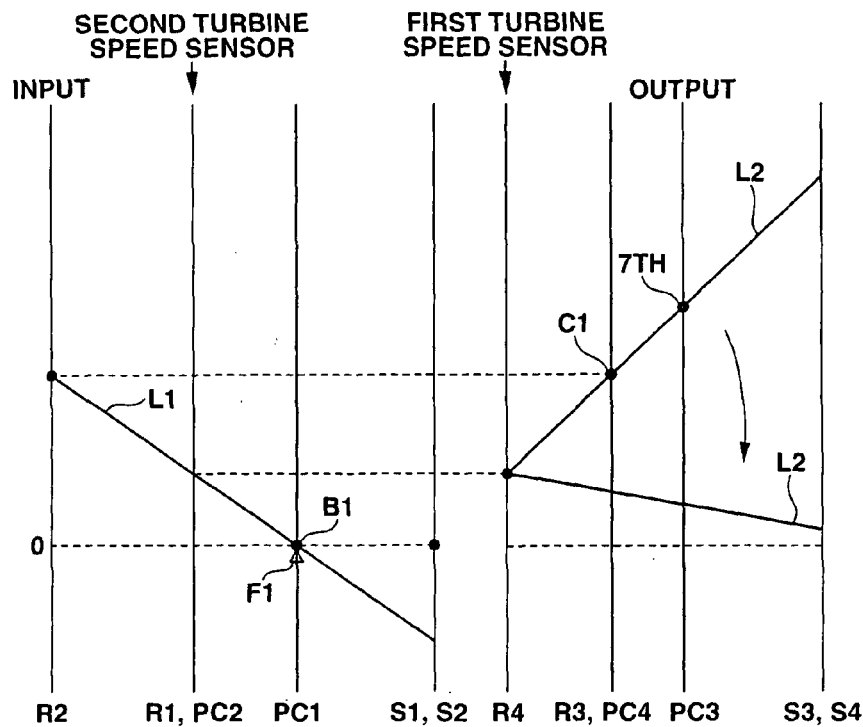
FIG. 28 is another speed relationship diagram of the automatic transmission, in which a neutral-state failure occurs to change the state of speed relationship of the automatic transmission in seventh gear.
Figure 29:
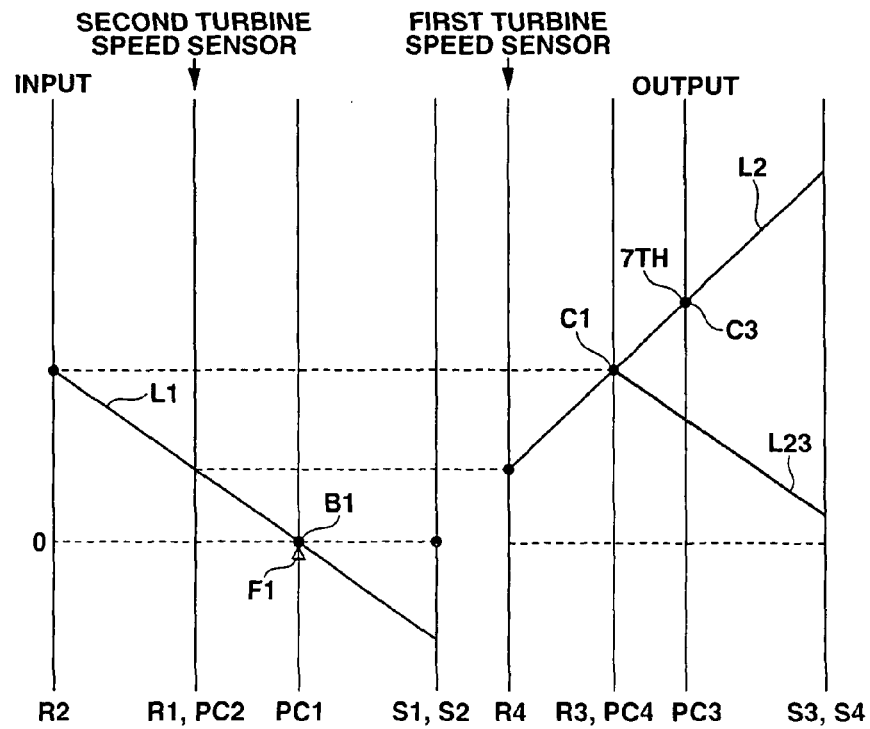
FIG. 29 is another speed relationship diagram of the automatic transmission, in which a neutral-state failure occurs to change the state of speed relationship of the automatic transmission in seventh gear.

In case seventh gear is selected, when the actual transmission gear ratio is lower than the normal transmission gear ratio of sixth gear as shown by the diagonally-shaded region of FIG. 17, it is judged that a neutral-state failure is present in the automatic transmission. If front brake B1 is in a slipping state, there is a possibility that the actual transmission gear ratio is lower than the normal transmission gear ratio of fifth gear, since lever L1 may rotate about the point of input shaft INPUT, and accordingly lever L2 may rotate about the point of third ring gear R3 or fourth planet-pinion carrier PC4 as shown in FIG. 27. Similarly, if input clutch C1 is in a slipping state, there is a possibility that the actual transmission gear ratio is lower than the normal transmission gear ratio of fifth gear, since lever L2 may rotate about the point of fourth ring gear R4 as shown in FIG. 28. Similarly, if H&LR clutch C3 is in a slipping state, there is a possibility that the actual transmission gear ratio is lower than the normal transmission gear ratio of fifth gear, since lever L23 may rotate about the point of fourth planet-pinion carrier PC4 as shown in FIG. 29. At this time, lever 24 remains inclined as in seventh gear.

As shown in FIGS. 27, 28 and 29, the movement of lever L1 is different in the above three possible cases of neutral-state failures. By checking the difference in detected rotational speed between first turbine speed sensor 3 and second turbine speed sensor 4, it is possible to identify the abnormal engaging element as front brake B1 or the other engaging elements.

In case the failure is present in front brake B1, it is possible to shift into sixth gear by applying 2346-brake B3. Accordingly, ATCU 20 first shifts into sixth gear, and then shifts into third gear, which does not use engagement of front brake B1, after vehicle speed Vsp decreases below set speed value Vsp0.

In case the failure is present in the engaging elements other than front brake B1, it is impossible to escape into other gears. Accordingly, ATCU 20 enters a neutral state and then shifts into third gear, which does not use engagement of input clutch C1 or H&LR clutch C3, after vehicle speed Vsp decreases below set speed value Vsp0.

As described above, at occurrence of neutral-state failures, the escape shift control process uses an escape gear (2-3 intermediate gear) which is not used under normal operating conditions. This is effective for expanding an available range of transmission gear ratios and ensuring an ability to drive the vehicle.

Based on the above-mentioned logic, this process may be implemented by preparing a map for selecting an escape gear in accordance with the state of the automatic transmission when a failure is detected.

<Abnormality identification control process and abnormality handling shift control process> The following describes a process of abnormality identification control, and a process of abnormality handling shift control which is performed depending on the cause of failure identified by the abnormality identification control process. These processes are carried out at vehicle restart after the aforementioned escape shift control process is performed and the vehicle is stopped. The abnormality handling shift control process is performed in accordance with a different logic from the logic or map used by the normal shift control process. Specifically, the abnormality handling shift control process uses an escape gear ratio set consisting of three escape gears which are beforehand defined for each abnormal engaging element, and controls shifts among the three gear ratios in accordance with vehicle speed Vsp as a parameter. The term "escape gear ratio set" introduced in this description may be generally used to represent a set consisting of a single escape gear (gear ratio) or a set consisting of a plurality of escape gears (gear ratios).

Figure 30:
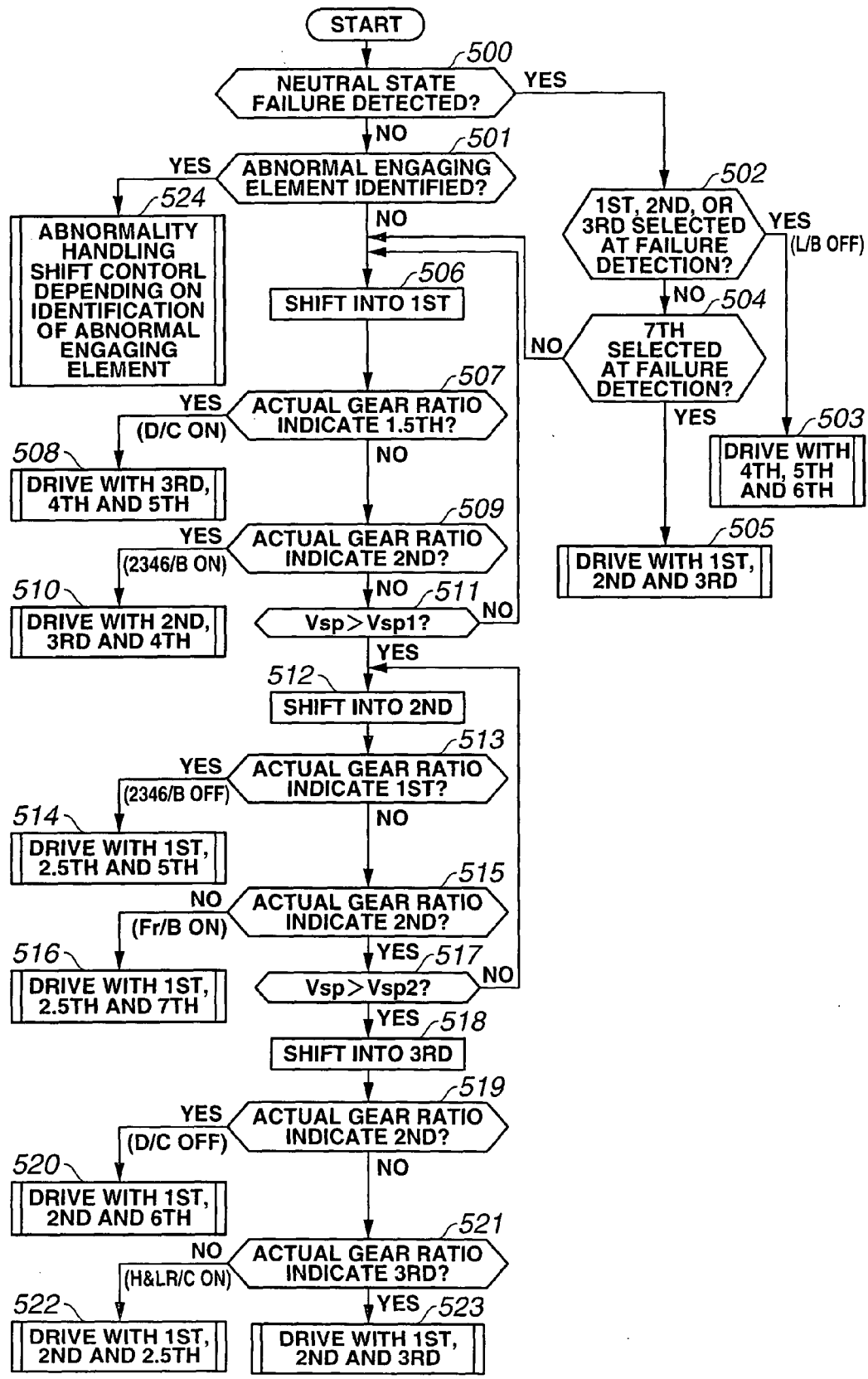
FIG. 30 is a flow chart showing a process of abnormality identification control and abnormality handling shift control provided in the first embodiment.

FIG. 30 is a flow chart showing a process of abnormality identification control and abnormality handling shift control provided in the first embodiment. As shown in FIG. 30, at Step 500, ATCU 20 judges whether or not a neutral-state failure is present in the automatic transmission. When the answer to Step 500 is YES, the routine proceeds to Step 502. On the other hand, when the answer to Step 500 is NO, the routine proceeds to Step 501.

At Step 501, ATCU 20 judges whether or not the abnormal engaging element is already identified by the failure identification process of FIG. 13. When the answer to Step 501 is YES, the routine proceeds to Step 524, at which ATCU 20 carries out the abnormality handling shift control in accordance with identification of the abnormal engaging element. On the other hand, when the answer to Step 501 is NO, the routine proceeds to Step 506. The abnormality handling shift control performed at Step 524 is defined as a control process to use three escape gears which are beforehand defined for each abnormal engaging element, and control shifts among the three gears in accordance with vehicle speed Vsp as a parameter. The shift control process for each abnormal engaging element of Step 524 is same as Steps 508, 510, 516, 522, or 523.

At Step 502, ATCU 20 judges whether or not first gear, second gear, or third gear is selected when the neutral-state failure is detected. When the answer to Step 502 is YES, the routine proceeds to Step 503. On the other hand, when the answer to Step 502 is NO, the routine proceeds to Step 504.

At Step 503, ATCU 20 selects an escape gear ratio set consisting of fourth gear, fifth gear, and sixth gear, and drives the vehicle using the escape gear ratio set. As mentioned above, in case a neutral-state failure occurs in first gear, second gear, or third gear, the cause of the failure is identified as the disengaging-state failure of low brake B2. Accordingly, the selecting the set of fourth gear, fifth gear, and sixth gear as an escape gear ratio set which does not use engagement of low brake B2 is effective for providing a driving torque and enhancing the driving performance.

At Step 504, ATCU 20 judges whether or not seventh gear is selected when the neutral-state failure is detected. When the answer to Step 504 is YES, the routine proceeds to Step 505. On the other hand, when the answer to Step 504 is NO, the routine proceeds to Step 506.

At Step 505, ATCU 20 selects an escape gear ratio set consisting of first gear (normal drive range), second gear (normal drive range), and third gear, and drives the vehicle using the escape gear ratio set. As mentioned above, in case a neutral-state failure occurs in seventh gear, the cause of the failure is identified as the disengaging-state failure of front brake B1, input clutch C1 or H&LR clutch C3. Accordingly, the selecting the set of first gear, second gear, and third gear as an escape gear ratio set which does not use engagement of front brake B1, input clutch C1 and H&LR clutch C3, is effective for providing a driving torque and enhancing the driving performance.

At Step 506, ATCU 20 selects normal drive range first gear as an escape gear and outputs commands accordingly.

At Step 507, ATCU 20 judges whether or not the actual transmission gear ratio is identical to the normal transmission gear ratio of 1-2 intermediate gear. When the answer to Step 507 is YES, the routine proceeds to Step 508. On the other hand, when the answer to Step 507 is NO, the routine proceeds to Step 509.

At Step 508, ATCU 20 selects an escape gear ratio set consisting of third gear, fourth gear, and fifth gear, and drives the vehicle using the escape gear ratio set. As mentioned above, 1-2 intermediate gear is established by engagement of low brake B2, first one-way clutch F1, and direct clutch C2, as shown in FIG. 19. On the other hand, when first gear is selected, the applying command is outputted only to low brake B2. Therefore, in this case, the cause of failure is identified as the engaging-state failure of direct clutch C2. Third gear, fourth gear, and fifth gear are established using engagement of direct clutch C2. Accordingly, the abnormality handling shift control process using the set of third gear, fourth gear, and fifth gear as an escape gear ratio set is effective for providing a driving torque and enhancing the driving performance.

At Step 509, ATCU 20 judges whether or not the actual transmission gear ratio is identical to the normal transmission gear ratio of second gear. When the answer to Step 509 is YES, the routine proceeds to Step 510. On the other hand, when the answer to Step 509 is NO, the routine proceeds to Step 511.

At Step 510, ATCU 20 selects an escape gear ratio set consisting of second gear, third gear, and fourth gear, and drives the vehicle using the escape gear ratio set. As shown in the speed relationship diagram of FIG. 9, second gear is established by engagement of low brake B2 and 2346-brake B3. On the other hand, when first gear is selected, the applying command is outputted only to low brake B2. Therefore, in this case, the cause of failure is identified as the engaging-state failure of 2346-brake B3. Second gear, third gear, fourth gear, and sixth gear are established using engagement of 2346-brake B3. Accordingly, the abnormality handling shift control process using the set of second gear, third gear, and fourth gear as an escape gear ratio set is effective for providing a driving torque and enhancing the driving performance.

At Step 511, ATCU 20 judges whether or not vehicle speed Vsp is higher than a predetermined set speed value Vsp1. When the answer to Step 511 is YES, the routine proceeds to Step 512. On the other hand, when the answer to Step 511 is NO, the routine returns to Step 506, repeating Steps 506 to 511. Set speed value Vsp1 may be set to such a value as 10 km/h, with which the identifying process using first gear as an escape gear can be completed.

At Step 512, ATCU 20 selects normal drive range second gear as an escape gear and outputs commands accordingly.

At Step 513, ATCU 20 judges whether or not the actual transmission gear ratio is identical to the normal transmission gear ratio of first gear. When the answer to Step 513 is YES, the routine proceeds to Step 514. On the other hand, when the answer to Step 513 is NO, the routine proceeds to Step 515.

At Step 514, ATCU 20 selects an escape gear ratio set consisting of first gear, 2-3 intermediate gear, and fifth gear, and drives the vehicle using the escape gear ratio set. As shown in the speed relationship diagram of FIG. 9, first gear is established by engagement of low brake B2. On the other hand, when second gear is selected, the applying command is outputted to low brake B2 and 2346-brake B3. Therefore, in this case, the cause of failure is identified as the disengaging-state failure of 2346-brake B3. First gear, 2-3 intermediate gear, fifth gear, and seventh gear are established without engagement of 2346-brake B3. Accordingly, the abnormality handling shift control process using the set of first gear, 2-3 intermediate gear, and fifth gear as an escape gear ratio set is effective for providing a driving torque and enhancing the driving performance. In general, an abnormality handling shift control process may be implemented by providing about three gear ratios. In this case, 2-3 intermediate gear which is not used under normal operating conditions is used to serve for the abnormality handling is shift control process.

At Step 515, ATCU 20 judges whether or not the actual transmission gear ratio is identical to the normal transmission gear ratio of second gear. When the answer to Step 515 is YES, the routine proceeds to Step 517. On the other hand, when the answer to Step 515 is NO, the routine proceeds to Step 516.

At Step 516, ATCU 20 selects an escape gear ratio set consisting of first gear, 2-3 intermediate gear, and seventh gear, and drives the vehicle using the escape gear ratio set. Since the actual transmission gear ratio is not identical to the normal transmission gear ratio of first gear nor second gear, it is identified that the state where input shaft INPUT is in an interlock state and output shaft OUTPUT is in a neutral state is established by engagement of front brake B1 and 2346-brake B3 as shown in the speed relationship diagram of FIG. 16. On the other hand, when second gear is selected, the applying command is outputted to low brake B2 and 2346-brake B3. Therefore, in this case, the cause of failure is identified as the engaging-state failure of front brake B1. First gear, 2-3 intermediate gear, and seventh gear are established using engagement of front brake B1. Accordingly, the abnormality handling shift control process using the set of first gear, 2-3 intermediate gear, and seventh gear as an escape gear ratio set is effective for providing a driving torque and enhancing the driving performance. In this case, 2-3 intermediate gear which is not used under normal operating conditions is used to serve for the abnormality handling shift control process.

At Step 517, ATCU 20 judges whether or not vehicle speed Vsp is higher than a predetermined set speed value Vsp2. When the answer to Step 517 is YES, the routine proceeds to Step 518. On the other hand, when the answer to Step 517 is NO, the routine returns to Step 512, repeating Steps 512 to 517. Set speed value Vsp2 may be set to such a value as 10 km/h, with which the identifying process using second gear as an escape gear can be completed.

At Step 518, ATCU 20 selects third gear as an escape gear and outputs commands accordingly.

At Step 519, ATCU 20 judges whether or not the actual transmission gear ratio is identical to the normal transmission gear ratio of second gear. When the answer to Step 519 is YES, the routine proceeds to Step 520. On the other hand, when the answer to Step 519 is NO, the routine proceeds to Step 521.

At Step 520, ATCU 20 selects an escape gear ratio set consisting of first gear, second gear, and sixth gear, and drives the vehicle using the escape gear ratio set. As shown in the speed relationship diagram of FIG. 9, second gear is established by engagement of low brake B2 and 2346-brake B3. On the other hand, when third gear is selected, the applying command is outputted to low brake B2, 2346-brake B3, and H&LR clutch C3. Therefore, in this case, the cause of failure is identified as the disengaging-state failure of H&LR clutch C3. First gear, second gear, sixth gear, and seventh gear are established without engagement of H&LR clutch C3. Accordingly, the abnormality handling shift control process using the set of first gear, second gear, and sixth gear as an escape gear is ratio set is effective for providing a driving torque and enhancing the driving performance.

At Step 521, ATCU 20 judges whether or not the actual transmission gear ratio is identical to the normal transmission gear ratio of third gear. When the answer to Step 521 is YES, the routine proceeds to Step 523. On the other hand, when the answer to Step 521 is NO, the routine proceeds to Step 522.

At Step 522, ATCU 20 selects an escape gear ratio set consisting of first gear, second gear, and 2-3 intermediate gear, and drives the vehicle using the escape gear ratio set. Since the actual transmission gear ratio is not identical to the normal transmission gear ratio of second gear nor third gear and the possibility of the neutral-state failure of third gear is eliminated at Step 502, it is identified that an abnormal gear-ratio failure is present due to an interlock state. In third gear, this interlock state is established by the engaging-state failure of front brake B1 or the engaging-state failure of H&LR clutch C3. On the other hand, the possibility of the engaging-state failure of front brake B1 is eliminated at Step 516. Therefore, in this case, the cause of failure is identified as the engaging-state failure of H&LR clutch C3. First gear, second gear, fourth gear, fifth gear, sixth gear, seventh gear, and 2-3 intermediate gear are established using engagement of H&LR clutch C3. Accordingly, the abnormality handling shift control process using the set of first gear, second gear, and 2-3 intermediate gear as an escape gear ratio set which is selected from the available seven gear ratios is effective for providing a driving torque and enhancing the driving performance. In general, an abnormality handling shift control process may be implemented by providing about three gear ratios. In this case, 2-3 intermediate gear which is not used under normal operating conditions is used to serve for the abnormality handling shift control process.

At Step 523, ATCU 20 selects an escape gear ratio set consisting of first gear, second gear, and third gear, and drives the vehicle using the escape gear ratio set. The foregoing steps eliminates the possibility of the engaging-state failure and disengaging-state failure of low brake B2, the engaging-state failure and disengaging-state failure of direct clutch C2, the engaging-state failure and disengaging-state failure of 2346-brake B3, the engaging-state failure of front brake B1, and the engaging-state failure of H&LR clutch C3. Although the cause of failure is not completely identified, at least the set of first gear, second gear, third gear may be normally used without the influence of the failure. Accordingly, the abnormality handling shift control process using the set of first gear, second gear, and third gear as an escape gear ratio set which is selected from the available seven gear ratios is effective for providing a driving torque and enhancing the driving performance.

In this embodiment, the cause of failure is identified by detecting the actual transmission gear ratio established by releasing some engaging elements after detection of the interlock-state failure. However, in case an interlock state is detected while drive wheels are brought to a lock state due to rapid braking, there is a possibility that the drive wheels are held stationary before completing the detection of the actual transmission gear ratio. Accordingly, in case it is determined at Step 501 that the cause of failure is not identified, the abnormality identification control process is carried out in vehicle restart after vehicle stop in order to reliably identify the abnormal engaging element.

The following describes effects and advantages produced by the automatic transmission of this embodiment.

(1) An automatic transmission comprising: a planetary gear arrangement (GS1, GS2) including a plurality of rotating elements (H1, S1, R1, PC1, S2, R2, PC2, S3, R3, PC3, S4, R4, PC4), and including an input rotating element (INPUT) adapted to be connected to a driving source (EG) of a vehicle and an output rotating element (OUTPUT) adapted to be connected to a drive wheel set of the vehicle; a plurality of engaging elements (B1, B2, B3, B4, C1, C2, C3, F1, F2) each arranged to vary an engagement state among the rotating elements of the planetary gear arrangement in such a manner to establish at least a normal gear ratio set; and a control section (20) configured to perform the following: selecting a gear from the normal gear ratio set in accordance with a running state of the vehicle under normal operating conditions; controlling the engagement state of each of the engaging elements in such a manner to shift into the selected gear; detecting an interlock state in which one of the engaging elements is incorrectly applied to hold the input rotating element and the output rotating element stationary; establishing, when the interlock state is detected, an escape gear by releasing one of the engaging elements needed to be applied to establish the selected gear; and identifying the incorrectly-applied engaging element in accordance with the running state of the vehicle resulting from establishing the escape gear, is effective for reliably escaping from the interlock-state failure, providing a driving torque even under failed conditions, providing a wide available range of transmission gear ratios in accordance with the identified incorrectly-applied engaging element, and thereby ensuring an ability to drive the vehicle.

(2) An automatic transmission wherein the control section is configured to perform the following: detecting an actual transmission gear ratio between the input rotating element and the output rotating element; and identifying the incorrectly-applied engaging element based on comparison between the actual transmission gear ratio and the selected gear when the interlock state is detected, is effective for identifying the abnormal engaging element using rotation sensors without providing hydraulic switches, which enhances the safety without cost-up and up-sizing due to additional elements.

(3) An automatic transmission wherein the escape gear is included in an escape gear ratio set including at least an emergency gear ratio set excluded from the normal gear ratio set, is effective for providing a wide range of gear ratios to drive the vehicle after detection of failures.

(4) An automatic transmission wherein the control section is configured to complete the identifying the is incorrectly-applied engaging element before stop of the vehicle after the interlock state is detected, is effective for providing a wide range of gear ratios immediately after detection of the interlock state, and for specifying available gear ratios at vehicle restart after vehicle stop.

Although at Step 2056 the abnormal engaging element is identified as one of front brake B1 and H&LR clutch C3 in accordance with the presence of engine braking, the system may be configured to use an escape gear which is established by engagement of both of them without such abnormality identification.

This application is based on a prior Japanese Patent Application No. 2006-92802 filed on Mar. 30, 2006. The entire contents of this Japanese Patent Application No. 2006-92802 are hereby incorporated by reference.

Although the invention has been described above by reference to certain embodiments of the invention, the invention is not limited to the embodiments described above. Modifications and variations of the embodiments described above will occur to those skilled in the art in light of the above teachings. The scope of the invention is defined with reference to the following claims.

What is claimed is:

1. An automatic transmission comprising:
   a planetary gear arrangement including a plurality of rotating elements, and including an input rotating element adapted to be connected to a driving source of a vehicle and an output rotating element adapted to be connected to a drive wheel set of the vehicle;
   a plurality of engaging elements each arranged to vary an engagement state among the rotating elements of the planetary gear arrangement in such a manner to establish at least a normal gear ratio set; and
   a control section configured to perform the following:
      selecting a gear from the normal gear ratio set in accordance with a running state of the vehicle under normal operating conditions;
      controlling the engagement state of each of the engaging elements in such a manner to shift into the selected gear;
      detecting an interlock state in which one of the engaging elements is incorrectly applied to hold the input rotating element and the output rotating element stationary;
      establishing, when the interlock state is detected, an escape gear by releasing one of the engaging elements needed to be applied to establish the selected gear; and
      identifying the incorrectly-applied engaging element in accordance with the running state of the vehicle resulting from establishing the escape gear,
   wherein the escape gear is included in an escape gear ratio set including at least an emergency gear ratio set excluded from the normal gear ratio set.

2. The automatic transmission as claimed in claim 1, wherein the control section is configured to perform the following:
   detecting an actual transmission gear ratio between the input rotating element and the output rotating element; and identifying the incorrectly-applied engaging element based on comparison between the actual transmission gear ratio and the selected gear when the interlock state is detected.

3. The automatic transmission as claimed in claim 1, wherein the control section is configured to complete the identifying the incorrectly-applied engaging element before stop of the vehicle after the interlock state is detected.

4. A method of controlling an automatic transmission comprising: a planetary gear arrangement including a plurality of rotating elements, and including an input rotating element adapted to be connected to a driving source of a vehicle and an output rotating element adapted to be connected to a drive wheel set of the vehicle; and a plurality of engaging elements each arranged to vary an engagement state among the rotating elements of the planetary gear arrangement in such a manner to establish at least a normal gear ratio set, the method comprising:

selecting a gear from the normal gear ratio set in accordance with a running state of the vehicle under normal operating conditions;

controlling the engagement state of each of the engaging elements in such a manner to shift into the selected gear;

detecting an interlock state in which one of the engaging elements is incorrectly applied to hold the input rotating element and the output rotating element stationary;

establishing, when the interlock state is detected, an escape gear by releasing one of the engaging elements needed to be applied to establish the selected gear; and identifying the incorrectly-applied engaging element in accordance with the running state of the vehicle resulting from establishing the escape gear, wherein the escape gear is included in an escape gear ratio set including at least an emergency gear ratio set excluded from the normal gear ratio set.

* * * * *